US012635699B2

(12) United States Patent
Niedecker

(10) Patent No.: US 12,635,699 B2
(45) Date of Patent: May 26, 2026

(54) SYSTEM FOR MANUFACTURING SAUSAGE-SHAPED PRODUCTS WITH CONSUMABLE CONTAINERS OF DIFFERENT TYPES

(71) Applicant: POLY-CLIP SYSTEM GMBH & CO. KG, Hattersheim (DE)

(72) Inventor: Frank Niedecker, Porza (CH)

(73) Assignee: POLY-CLIP SYSTEM GMBH & CO. KG, Hattersheim (DE)

( * ) Notice: Subject to any disclaimer, the term of this patent is extended or adjusted under 35 U.S.C. 154(b) by 0 days.

(21) Appl. No.: 18/862,590

(22) PCT Filed: May 10, 2023

(86) PCT No.: PCT/EP2023/062426
§ 371 (c)(1),
(2) Date: Nov. 4, 2024

(87) PCT Pub. No.: WO2023/217864
PCT Pub. Date: Nov. 16, 2023

(65) Prior Publication Data
US 2025/0280841 A1 Sep. 11, 2025

(30) Foreign Application Priority Data
May 10, 2022 (EP) .................................... 22172577

(51) Int. Cl.
*A22C 11/00* (2006.01)
*A22C 11/12* (2006.01)
(52) U.S. Cl.
CPC .................................. *A22C 11/125* (2013.01)
(58) Field of Classification Search
CPC ...... B65H 75/14; B65H 75/22; B65H 75/182; A22C 11/125
(Continued)

(56) References Cited

U.S. PATENT DOCUMENTS 10,059,562 B2 * 8/2018 Meyrahn ............ B65H 75/2281
2005/0024127 A1 * 2/2005 Kihara .................. G11C 11/417
327/540

(Continued)

FOREIGN PATENT DOCUMENTS

CN 101318600 A 12/2008
CN 111322298 A 6/2020
(Continued)

OTHER PUBLICATIONS

International Search Report issued in PCT/EP2023/062426, mailed Jul. 26, 2023, 3 pages.
(Continued)

*Primary Examiner* — Richard T Price, Jr.
(74) *Attorney, Agent, or Firm* — Fitch, Even, Tabin & Flannery LLP

(57) ABSTRACT

A system for manufacturing sausage-shaped products, like sausages, the system comprising a clipping machine and at least a clip reel of a first type and at least a clip reel of a second type, or only at least a clip reel of the second type, each of which is configured to receive a plurality of closure means, like clips, wound thereon. The clip reel of the first type has a hub with a longitudinal center axis and an inner surface provided with first coupling means being arranged at least approximately in the center of the clip reel relative to the longitudinal center axis. The clip reel of the second type has a hub with a longitudinal center axis and an inner surface provided with second coupling means being arranged at least in the vicinity of the center of the clip reel relative to the longitudinal center axis. The clipping machine has at least one reel holding means configured to hold at least one clip reel of the first or the second type and comprises at least one shaft for receiving a clip reel of the first or second type. Furthermore, the clipping machine comprises at least one abutment means against which the clip reel of the first or
(Continued)

100 second type mounted on the shaft abuts in one axial direction of the shaft, and at least one counter-coupling means cooperating with the first or second coupling means of the clip reel of the first or second type for reversibly fixing the clip reel on the shaft in the other axial direction of the shaft.

20 Claims, 13 Drawing Sheets

(58) Field of Classification Search
USPC ............................................ 452/48; 242/602
See application file for complete search history.

(56) References Cited

U.S. PATENT DOCUMENTS

| | | |
|---|---|---|
| 2008/0272225 A1 | 11/2008 | Hein |
| 2016/0176674 A1 | 6/2016 | Meyrahn et al. |

FOREIGN PATENT DOCUMENTS

| | | |
|---|---|---|
| CN | 111480676 A | 8/2020 |
| EP | 3006358 A1 | 4/2016 |
| EP | 4275502 B1 | 12/2025 |

OTHER PUBLICATIONS

Written Opinion of the International Searching Authority issued in PCT/EP2023/062426, mailed Jul. 23, 2023, 10 pages.
Communication pursuant to Article 94(3) EPC issued in corresponding European Application No. 23727243.0; dated Jan. 12, 2026; 4 pages.
Office Action issued in corresponding Chinese Application No. 202380051249.2; dated Dec. 22, 2025; 12 pages.

* cited by examiner

SYSTEM FOR MANUFACTURING SAUSAGE-SHAPED PRODUCTS WITH CONSUMABLE CONTAINERS OF DIFFERENT TYPES

CROSS-REFERENCE TO RELATED APPLICATIONS

This application is a U.S. national phase application filed under 35 U.S.C. § 371 of International Application Number PCT/EP2023/062426 filed May 10, 2023, designating the United States, which claims priority from European Application Number 22172577.3, filed May 10, 2022.

FIELD OF THE INVENTION

The present invention relates to a system for manufacturing sausage-shaped products, comprising a clipping machine with at least one reel holding means and clip reels of a first and/or a second type for storing closure means thereon. The present invention further relates to a clip reel of a second type.

BACKGROUND ART

In practice, clipping machines are used for producing sausage-shaped products, like sausages, in which filling material is fed into a tubular packaging casing which is stored on a filling tube, and which is closed at its front end by at least one closure means, like a closure clip. After a predetermined portion of filling material has been fed into the tubular packaging casing, a plait-like portion being at least substantially free from filling material is formed thereto, and at least one first closure clip is placed and closed on said plait-like portion by a clipping device, for closing the packaging casing just filled. Additionally, at least one second closure clip may be placed for closing the front end of the sausage-shaped product to be produced next. Subsequently, the sausage-shaped product just produced is separated from the remaining supply of packaging material and the completed sausage-shaped product is discharged from the clipping machine.

Usually, the closure clips are stored as a clip supply in the form of a continuous clip line wound on a clip reel as disclosed, for example, in DE 20 2007 006 428 U1. A clip reel comprises a reel body with a hub, and disk-shaped outer walls respectively arranged at the axial front end faces of said hub. Said outer walls extend beyond the circumferential surface of the hub in the radial direction. The storage space defined by the inner facing surfaces of the disk-shaped outer walls and the outer circumferential surface of the hub is used to accommodate the clip line.

This known clip reel can be placed on a reel holding means of the clipping machine rotatable, but secured in axial direction. After placing the clip reel on the reel holding means of a clipping machine, the clip line is inserted into the clipping area of the clipping machine. With each clipping operation, the clipping machine draws a clip from the clip line. Accordingly, the clip reel is rotated by the tension in the clip line from the pulling of the clipping machine or by an active drive on the reel holding means of the clipping machine to feed the next clip of the clip line to the clipping area.

Depending on the sausage-shaped product to be manufactured, different sized clips, which typically have a U-shape or a shape similar to a letter "U", can be used. For example, they may differ in the length of the legs of the U-shaped clips and/or the distance between the clip legs, i.e., the length of the bottom of the U-shaped clips. Depending on the size of the clips to be used, different numbers of clips can be wound onto one and the same clip reel to form the clip supply.

The number of pieces of sausage-shaped products to be manufactured can vary greatly depending on the product. For example, it is possible that a certain product is to be produced in very large quantities, so that a frequent exchange of an empty clip reel for a full clip reel is required. Furthermore, if clips with large geometric dimensions have to be used for this product to be manufactured, the number of necessary changes increases further significantly. On the other hand, it is also possible to manufacture products in only small quantities where only a few clips need to be used. If, in such a case, the geometric dimensions of the clips are small, many clips will fit on one reel, but here too, due to the small number of products to be produced, frequent reel changes must be made and the unused clips must be stored as tied capital.

Since the reel holding means of a clipping machine are usually located above the upper housing portion of the clipping machine, this frequent change is a cumbersome task for the operator due to the weight of a clip reel loaded with a large number of clips made of metal and the need to lift the relatively heavy clip reel.

It is therefore an object of the present invention to provide a system and a clip reel to be used within the system that allow for easy production of various sausage-shaped products in which closure clips of different sizes and/or quantities can be efficiently used.

SUMMARY

The above object is solved with respect to the system by the technical teaching given in independent claim 1. Dependent claims 2 to 7 define further implementations of the inventive idea described in claim 1. With respect to the clip reel, the foregoing task is solved by the technical teaching given in independent claim 8. Dependent claims 9 to 15 set forth advantageous embodiments of the invention defined in claim 8.

The following description contains specific information pertaining to implementations in the present disclosure.

According to a first aspect, the system for manufacturing sausage-shaped products, like sausages, comprises a clipping machine and at least a clip reel of a first type and at least a clip reel of a second type, or only at least a clip reel of the second type, each of which is configured to receive a plurality of closure means, like clips, wound thereon, wherein the clip reel of the first type has a hub with a longitudinal center axis and an inner surface provided with first coupling means being arranged at least approximately in the center of the clip reel relative to the longitudinal center axis, wherein the clip reel of the second type has a hub with a longitudinal center axis and an inner surface provided with second coupling means being arranged at least in the vicinity of the center of the clip reel relative to the longitudinal center axis, wherein the clipping machine has at least one reel holding means configured to hold at least one clip reel of the first or the second type and comprising at least one shaft for receiving a clip reel of the first or second type, at least one abutment means against which the clip reel of the first or second type mounted on the shaft abuts in one axial direction of the shaft, and at least one counter-coupling means cooperating with the first or second coupling means of the clip reel of the first or second type for reversibly fixing the clip reel on the shaft in the other axial direction of the shaft.

Such a system may be able to use different types of clip reels like clip reels capable of storing a relatively small number of clips and clip reels capable of storing a relatively large number of clips in comparison to the former clip reels.

If, for example, a product is to be manufactured continuously in large quantities, a clip reel can be used which can accommodate a larger number of clips than a clip reel for "normal" operation, where a product is to be produced in usual quantities. This significantly reduces the number of times an empty clip reel needs to be changed for a full clip reel, making the entire production process more efficient and reducing the physical burden on the operator. Once this production process has been completed and a product is now to be manufactured in only small quantities, a clip reel can be used which, as already explained, can only accommodate a significantly smaller number of clips compared with the clip reel storing a large number of clips. The smaller number of clips also reduces the weight compared to the first-mentioned clip reel, which makes the changeover process easier for the operator.

This advantage is achieved by providing the clip reels with the coupling means which may be located at different positions on the inside of the clip reel hub, depending on the type of clip reel, and which can cooperate with the counter-coupling means of the reel holding means, wherein the counter-coupling means of the reel holding means and the abutment means can be the same for all reels. The abutment means can define an axial position that can be the same for all reels, making it easier for the operator to push the clip reels on the clip holding means.

In principle, it is also possible that the axial position of the clip reels of the first and second types can be defined only by the counter-coupling means of the reel holding means. In this case, the abutment means can be omitted or the abutment means can be shifted in the axial direction so that they no longer come into contact with the clip reels and can thus be used for other purposes.

The clipping machine used in the system may be configured so that the reel holding means can hold only one clip reel of the first type or of the second type. It is also possible that the reel holding means of the clipping machine can hold two or more reels at the same time, whereby the combinations are possible that two or more reels of the first type, two or more reels of the second type or one reel of the first type and at least one reel of the second type and vice versa can be held by the reel holding means. If the reel holding means are capable of holding two clip reels of the same or different types, it is further advantageous if the clip reels are arranged side by side on the reel holding means.

In some embodiments, a distance between the abutment means and the counter-coupling means of the reel holding means can be at least approximately equal to a distance on the clip reel of the first or second type between a front end of the clip reel of the first or second type and the first or second coupling means of the clip reel of the first or second type, such that a clip reel mounted on the shaft of the reel holding means cannot move in the axial direction of the shaft during operation. This allows the same abutment means and the same counter-coupling means of the reel holding means to be used for the different clip reel types.

To be compatible with the system, the relevant dimensions on the system may be adopted by the clip reels. For axially locking a clip reel of the first or second type, the clip reel may abut on the abutment means on one side while being by the interaction of first or second coupling means with the counter-coupling means on the other side. The distance between abutment means and counter-coupling means can be defined as the locking distance.

To be compatible to further different types of clip reels, the locking distance between the abutment means and the counter-coupling means can be variable. For example, the shaft can be extendable, for example telescopically extendable, therefore increasing or decreasing the distance between the abutment means and counter-coupling means.

The coupling means of the clip reels can be designed in different ways. In a preferred embodiment, the coupling means of a clip reel of a first or second type comprises at least one rib at least approximately extending in circumferential direction for interaction with the counter-coupling means of the reel holding means.

This ensures the axial stabilization of the clip reel by having the counter-coupling means interact with the rib. The interaction stabilizes the clip reel, effectively hindering it from tilting and tipping over.

A clip reel of the first type may have exactly one rib, and a clip reel of the second type may have two ribs spaced axially relative to each other. It is advantageous if the two ribs are arranged symmetrically to the center plane extending perpendicular to the longitudinal axis of the clip reels. Moreover, it is possible for the rib(s) to extend over the entire inner circumferential surface of the hub in an orientation at least approximately perpendicular to the longitudinal axis of the clip reel. Likewise, it is possible for the rib(s) to extend only in sections along the inner circumferential surface of the hub.

The cross-sectional shape of the rib(s) can be designed differently and be adapted to the need. It is of advantage when at least one section of the rib, preferably a side wall extends at least approximately perpendicular to the longitudinal center axis of the clip reel. Preferably, the rib has a rectangular cross-sectional shape.

In some embodiments, the counter-coupling means of the shaft of the reel holding means comprises biasing means, such that the counter-coupling means retract into the shaft when force is exerted onto the counter-coupling means and return out of the shaft when no force is exerted onto the counter-coupling means.

With this, a clip reel can be easily attached and removed from the reel holding means by having the counter-coupling means retract during the step of mounting and unmounting the respective clip reel. The counter-coupling means may comprise a tubular-like shaped body, or a cuboid-like shaped body or other types of bodies. The counter-coupling means may comprise a flat or non-flat surface at its front end, such as a preferably rounded cone.

By having a clip reel slide on the shaft of the reel holding means from the front side, the counter-coupling means are retracted into the shaft. When the reel is slid on, the counter-coupling means move back out of the shaft and lock the reel.

In a further embodiment, the counter-coupling means comprise multiple holder noses, preferably arranged circumferentially.

By providing multiple holder noses, the clip reels with to an extent circumferentially disposed ribs are compatible with the reel holding means by having multiple holder noses to interact with. Even, when there is a gap in the first or second coupling means of the clip reels of the first and/or second type, multiple holder noses ensure that there is always at least one holder nose interacting with the first or second coupling means.

In a preferred embodiment, the reel holding means comprises two shafts, each shaft for receiving a clip reel of the first or second type, wherein preferably the two shafts are arranged at least substantially opposite to each other.

Having multiple shafts for holding clip reels increases the uptime during production even further, since a second clip reel can be used as backup clip reel when the first clip reel is emptied.

In the case of two shafts, these can be attached to a common bracket attached to the frame of the clipping machine, in such a way that the bracket extends between the two shafts. Here, the longitudinal axes of the two shafts can be coaxial with each other or enclose an obtuse angle with each other.

With the reel holding means, the clip reels are preferably located close to the clipping site of the clipping machine such that the distance between the clip reels and the clipping site is minimized. By having the clip reels positioned substantially opposite to each other it is ensured that the clip reels do not contact each other.

In a further preferred embodiment, the clip reels of the first and second type comprise radially extending outer walls defining a space for the closure means and wherein one outer wall abuts against the abutment means of the reel holding means.

The outer walls may act as a containment for holding the clips. Accordingly, the outer walls preferably may be bigger in diameter as the corresponding clip reel hub. Furthermore, the outer walls may abut against the abutment means to axially stabilize the clip reel during operation. The outer walls can be disk-shaped, square shaped or have any other shape.

In another embodiment, the outer walls of the clip reels comprise at least one hole, or at least one outer wall consists of transparent or semi-transparent material.

The holes enable the operator to inspect the loaded clips from all sides of the clip reel. Alternatively or additionally, transparent outer clip reel walls allow to easily check the amount of loaded clips on the clip reel.

In some embodiments, the clip reel of the second type holds at least 1.5 times the amount of clips as the clip reel of the first type. As already mentioned previously, this has the advantage that clip reels with more clips can be used in this system.

According to another aspect of the invention (second aspect of the invention), a clip reel for holding closure means to be used for manufacturing sausage-shaped products, like sausages, comprises a hub having an inner surface and a longitudinal center axis, and wherein the inner surface of the hub comprises coupling means, wherein the coupling means are adapted to lock the clip reel onto a shaft of reel holding means of a clipping machine in conjunction with counter-coupling means of the shaft by having the counter-coupling means of the shaft couple with the coupling means of the clip reel.

Such a clip reel is compatible with the system for manufacturing sausage-shaped products as described earlier.

In a preferred embodiment, the clip reel consists of two halves, which are preferably symmetrical to a plane extending at least substantially perpendicular to the longitudinal center axis of the hub, the hubs being preferably releasably connectable to each other to form the clip reel, wherein at least one latch hook is further preferably used for connecting the halves.

The clip reel can be made of different materials. If the clip reel is made of plastics, especially a biodegradable plastic, the clip reel can be produced by moulding two halves of the clip reel separately. Afterwards, the halves can be combined into the final clip reel. This production method may reduce production cost.

The latch hook provides a simple mechanism to connect both halves. Other mechanisms apart from latch hooks are also possible, for example a bayonet mount or inner and outer threads.

In a further embodiment, the coupling means of the clip reel comprises two to an extent circumferentially disposed ribs.

Two rips ensure that the clip reel is generally compatible with the system in both orientations. At least one rib may be interacting with the counter-coupling means of the reel holding means, regardless of the orientation.

In a preferred embodiment, the coupling means of the clip reel comprises at least one circumferentially extending groove.

Alternatively or additionally, at least one groove may be used as coupling means for coupling with the counter-coupling means. In this regard, the groove may extend completely or partially along the in the circumferential surface of the hub in an orientation at least approximately perpendicular to the longitudinal axis of the clip reel. Using at least one groove gives the advantage to axially stabilize the clip reel without having to abut against the abutment means of the reel holding means.

The use of one or more grooves on the inner circumferential surface of the hub and the use of in particular a plurality of counter-coupling means on a shaft of reel holding means of a clipping machine makes it possible to omit with abutment means provided on the reel holding means, thereby allowing with the engagement of the at least one counter-coupling means, but advantageously a plurality of counter-coupling means, to securely fix the clip reel axially on the shaft.

In another preferred embodiment, the interaction of the counter-coupling means with the coupling means of the clip reel comprises projection of the counter-coupling means into a free space defined by the coupling means of the clip reel.

This enables the clip reel to be held on the shaft. The counter-coupling means hold the clip reel on track by projecting into the free space, defined by the coupling means or a groove of the clip reel. The interaction preferably may be a form-fitting interaction.

In some embodiments, the hub comprises outer walls extending radially from the outer surface of the hub to hold closure means between the outer surface of the hub and the outer walls. By doing this, the outer walls act as side barriers for preventing the closure means stored in between from damage. Therefore, the assembly consisting of the reel and the closure means is compact and easier to transport.

In another embodiment, the clip reel comprises at least one space for an item. The item can be for example transponders, RFID-tags, data storage or other items. This can be beneficial for categorizing the clip reel by storing clip specific or clip reel specific information on the item.

In an additional embodiment, the at least one space comprises at least a dielectric which covers the item. The dielectric can protect the item from influences. The dielectric can be part of the clip reel, when an external read-out system necessitates such an arrangement for the item.

In some embodiments, the clip reel is able to be reversibly attached to reel holding means in a first or a second orientation. This ensures that the clip reel can be attached in both orientations. Furthermore, it can be rotated clockwise and counter-clockwise. Since the filled reels can be very heavy, this can be an advantage during the montage of the clip reel onto the system.

According to another aspect, a clip reel of a first type for holding closure means to be used for manufacturing sausage-shaped products, like sausages, comprises a hub having an inner surface and a longitudinal center axis, and wherein the inner surface of the hub comprises coupling means, wherein coupling means lock the clip reel of the first type onto a shaft in conjunction with counter-coupling means of the shaft by having the counter-coupling means of the shaft couple with the coupling means of the clip reel. The coupling means of the clip reel of the first type comprises at least one groove, being preferably approximately centered circumferentially.

Other features of the disclosure being applicable to clip reels of the first or second type can be combined with this embodiment of a clip reel of the first type or vice versa.

It is advantageous to provide a circumferential groove as coupling means since the counter-coupling means of reel holding means can interact with the groove to lock the clip reel, similar to rails.

A clip reel with counter-coupling means comprising a groove as defined earlier is compatible with a system, where the reel holding means does not comprise abutment means. Thus, it is possible to mount the clip reel on the reel holding means without having the clip reel abut on the abutment means.

The features applicable to other systems in this disclosure are also applicable to the system without the abutment means.

In a preferred embodiment, the width of the counter-coupling means of the shaft is equal to the width of the groove of the clip reel, such that the clip reel is locked in both axial directions.

The closure means, which are stored onto the clip reel, may be R-clips. R-clips comprise a U-like shape and may be connected to each other by extensions extending away from the free edges of the U. In general, several R-clips may form a chain and due to some flexibility, the chain can be bent into a circular shape, forming windings around a center axis. Thus, the chain of R-clips may be wound multiple times around the outer surface of the clip reels central hub. In this way, up to 7300 R-clips may be stored onto a single clip reel.

Prior to operation, the clip reel is loaded with closure means. A free end of a chain of closure means is then attached to the outside facing surface of the hub of the clip reel between the outer walls. Afterwards, the chain is wound around the hub such that several turns around the hub are achieved. The filled clip reel is attached onto a reel holding means. A free end may be used to attach the chain of closure means to a corresponding clipping machine.

For operation, one or multiple clip reels regardless of the type are attached to reel holding means. The clip reels are attached from either side by the clip reel onto the corresponding shaft of reel holding means. The inner diameter of the hub of the clip reel is generally large enough to fit the outer diameter of the shaft. Once the clip reel is moved into the operating position on reel holding means, counter-coupling means are locking the clip reel onto the shaft by interacting with first or second coupling means. The clip reels are now limited to rotational movement.

When the clip procedure starts, the clipping machine draws a closure means for closing a sausage-shaped product using a die and a punch. The closure means is therefore removed from the chain of closure means. The following closure means is drawn in position for the next closure mean application, effectively drawing on the chain of closure means and as an effect rotating the clip reel.

During operation, since the clip reels can achieve high rotational speeds while holding a large amount of closure means, the clip reel can become unstable and slide off of reel holding means. It is also possible that system starts to shake or vibrate. Thus, a good connection, e.g. preferably a snug fit, and resilience against forces in axial direction of the clip reel is necessary.

At a certain point, enough closure means have been drawn from the clip reel and the end of the chain of closure means attached to clip reel is released from the clip reel. Following this, the emptied clip reel has to be replaced by a new clip reel loaded with closure means.

The reel holding means may comprise a plurality of holder noses. However, it should be noted that a single holder nose may be sufficient. Also, when the circumferentially extending rib on the inner surface of the inner hub comprises at least one gap, one holder nose on the shaft may also be sufficient when the respective shaft rotates with the clip reel.

The clip reel may rotate relative to the reel holding means. For rotation, the chain of closure means is under tension when the clipping machine draws another clip from the clip reel.

Alternatively, the reel holding means may rotate together with the attached clip reel. For this, the reel holding means may comprise a bearing or a rotary actuator. A coordinated rotation of the reel holding means and the clip reel is useful to reduce damage between the reel holding means and the clip reel. The rotary actuator may stepwise rotate the reel holding means together with the clip reel to reduce the stress on the chain of closure means.

Furthermore, while the ribs are preferably having a rectangular cross-section, it is noted that other types of cross-section are also possible, such as rounded cross-sections, pointed shapes, fins, curved or the like.

The clip reels may be made of materials such as plastic, stainless steel, aluminium, wood or other materials such as carbon fibre.

The clip reels may also consist of a material that is transparent or partly transparent, in order to be able to see from the outside the degree of filling, i.e., how much clip is still present on clip reels.

According to a third aspect of the invention, the above-stated problem is solved by a system for manufacturing sausage-shaped products, like sausages, the system comprising a clipping machine and at least a clip reel of a first type and at least a clip reel of a third type or a type different to the first type and/or second type, or only at least a clip reel of the third type, each of which is configured to receive a plurality of closure means, like clips, wound thereon, wherein the clip reel of the first type has a hub with a longitudinal center axis and an inner surface provided with first coupling means being arranged in the center of the clip reel relative to the longitudinal center axis, wherein the clip reel of the third type has a hub with a longitudinal center axis and an inner surface provided with third coupling means, wherein the third coupling means divide the clip reel of the third type into a first axial section and a second axial section, wherein an axial length of the first axial section is shorter than an axial length of the second axial section, wherein the clipping machine has at least one reel holding means configured to hold at least one clip reel of the first or the third type and comprising: at least one shaft for receiving a clip reel of the first or third type, at least one abutment means, against which the clip reel of the first or third type mounted on the shaft abuts in an axial direction of the shaft, and at least one counter-coupling means cooperating with the first or third coupling means of the clip reel of the first or third type for reversibly fixing the clip reel on the shaft in the other axial direction of the shaft, wherein the clip reel of the first type can be fixed to the reel holding means in two longitudinal orientations and wherein the third coupling means of the clip reel of the third type can only engage the counter-coupling means when the first axial section of the clip reel of the third type is oriented towards the abutment means of the reel holding means. Preferably, the clip reel of the third type only comprises the first axial section and the second axial section.

The term third clip reel is used to distinguish the clip reel of the system according to the third aspect of the invention from the second clip reel of the system according to the first aspect of the invention described above with respect to claim 1. Of course another term, such as alternative clip reel or unidirectional clip reel, could be used instead of the term third clip reel without deviating from the core of the invention.

The first axial section is preferably defined between a first axial end surface of the clip reel of the third type and the third coupling means in the direction of (or parallel to respectively) the longitudinal center axis of the hub of the clip reel of the third type. Analogously, the second axial section is defined between the third coupling means and a second axial end surface of the clip reel of the third type opposite the first axial end surface. The first and/or second axial end surface preferably extend on an abutment diameter of the third clip reel. The abutment diameter is a diameter of the clip reel that is equal to a diameter of abutment means of the reel holding means when the clip reel of the third type is arranged on the at least one shaft of the clip reel. That is the first and/or second axial end surface and the abutment means extend at least along the abutment diameter.

The clip reel of the third type may comprise surfaces that protrude beyond the first and/or axial end surface in the axial direction. Preferably, the clip reel of the third type has its greatest axial length between the first axial end surface and the second axial end surface. Preferably, the first axial section and the second axial section are defined at the same diameter of the clip reel, wherein the first axial section of the clip reel of the third type at least partially abuts the abutment means of the reel holding means, when the clip reel of the third type is received on the shaft of the reel holding means.

The two possible longitudinal orientations of the first clip reel are different orientations of the clip of the first type with regard to its longitudinal center axis. A rotation of the clip reel about its center axis does not change the longitudinal orientation. Preferably, the center axis of the clip reel of the first type is parallel, in particular congruent, in the two longitudinal orientations that allow fixing of the clip reel of the first type to the reel holding means by engagement of the first couplings means with the counter-coupling means. That is, a change from a first preferred longitudinal orientation to the second preferred longitudinal orientation is achievable by flipping the clip reel of the first type for 180° degrees around an axis perpendicular to its center axis.

According to a first preferred embodiment of the system according to the third aspect of the invention, the clip reel of the third type comprises exactly one third coupling means. Providing exactly one third coupling means can reduce manufacturing cost of the clip reel of the third type and/or tooling costs during manufacturing of the clip reel of the third type.

Preferably, the clip reel of the third type is symmetrical to a center plane perpendicular to its center axis except for the third counter coupling means. As the third counter coupling means divide the clip reel of the third type into two axial sections of different axial length, the clip reel of the third type in itself is not symmetrical to the center axis. That is, a clip reel of the third type would be entirely symmetrical to the center plane if no third counter coupling means were provided. Preferably, a main body of the clip reel of the third type is symmetrical to a center plane. The third coupling means are provided on the main body of the clip reel of the third type, preferably provided spaced apart from a symmetry plane perpendicular to the center axis.

Preferably, the clip reel of the third type comprises a marker identifying the first axial section or the second axial section. The clip reel of the third type may also comprise two different markers each marking one of the first axial section and the second axial section. Preferably, the marker is a color marker. The color marker is preferably provided on an outer wall of the clip reel of the third type extending from the hub. A marker can help a user to identify the first axial section and thus facilitates assembly of the clip reel of the third type on the reel holding means. The reel holding means may comprise a corresponding holding marker matching a marker identifying the first axial section.

According to a fourth aspect, the invention solves above problem with a clip reel for holding closure means to be used for manufacturing sausage-shaped products, like sausages, comprising a hub having an inner surface and a longitudinal center axis, and wherein the inner surface of the hub comprises coupling means, wherein the third coupling means divide the clip reel of the third type into a first axial section and a second axial section, wherein an axial length of the first axial section is shorter than an axial length of the second axial section; wherein the coupling means are adapted to lock the clip reel onto a shaft of reel holding means of a clipping machine in conjunction with counter-coupling means of the shaft by having the counter-coupling means of the shaft couple with the coupling means of the clip reel when the first axial section is oriented away from a free end of the shaft.

It shall be understood that the system according to the third aspect of the invention and the clip reel according to the fourth aspect of the invention, can comprise similar and identical embodiments as the system according to the first aspect of the invention and the clip reel according to the second aspect of the invention. Such embodiments are in particular described in the dependent claims. In so far, reference is made to the above description of the system and the clip reel described above.

Further advantages and preferred embodiments of the present invention will be described in the following together with the drawings listed below. Using the correction orientation of the Figs., downstream refers to devices or things being further located on the left and upstream refers to devices and things being further located on the right in the Figs.

BRIEF DESCRIPTION OF THE FIGURES

FIG. 3E is an isometric view of a reel half of a clip reel of the second type.

DETAILED DESCRIPTION OF THE FIGURES

Figure 1:
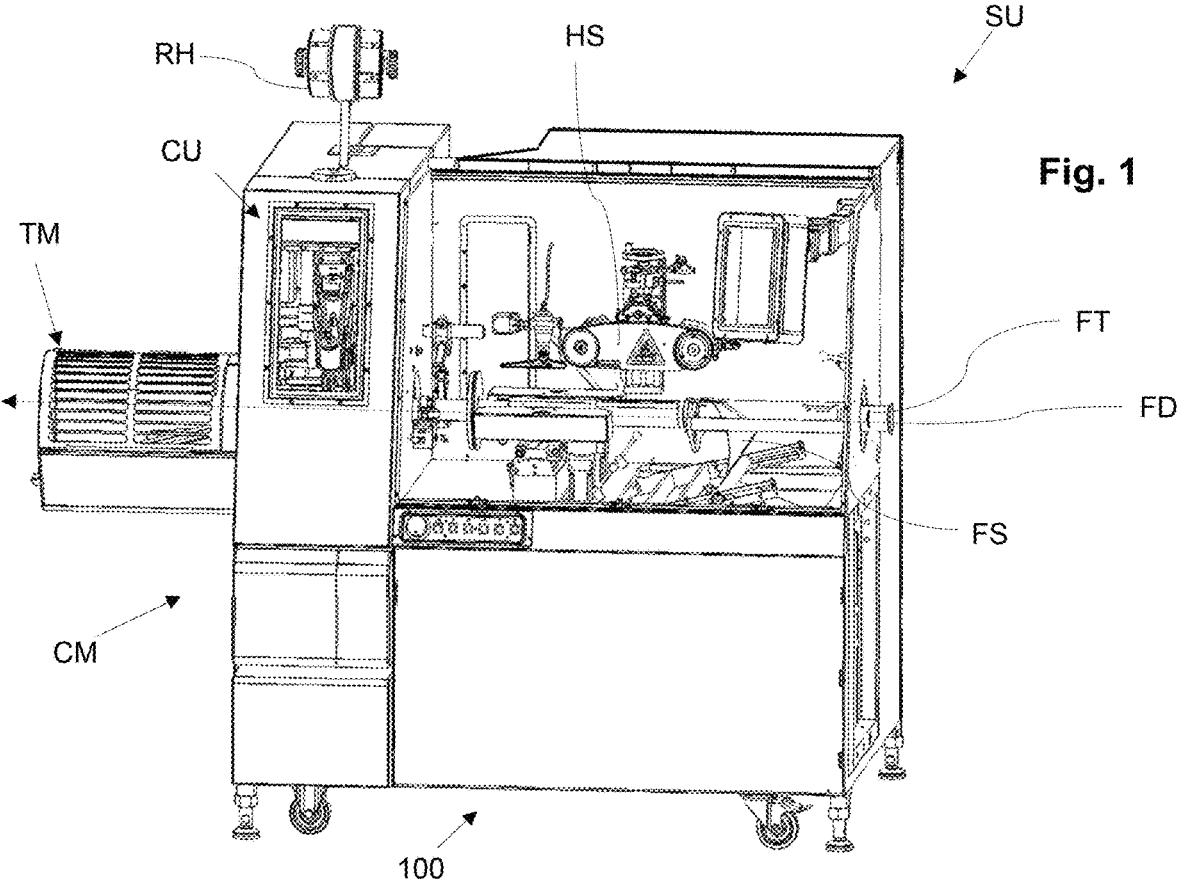
FIG. 1 is an isometric view of a system according to the invention comprising a clipping machine with a reel holding means for holding clip reels of a first and/or second type.

Components of a system 100 for manufacturing sausage-shaped products, like sausages, according to the invention are, inter alia, shown in FIGS. 1 to 3F. System 100 comprises a clipping machine CM shown in FIG. 1, and at least a clip reel 200 of a first type depicted in FIGS. 2A to 2C and/or clip reels 300 of a second type shown in FIGS. 3A to 3F.

Clip reels 200; 300 of the first and second type are used to receive a strand or line of closure means, like closure clips, wherein the strand or line is formed by a series of contiguous clips for closing sausage-shaped products by clipping machine CM. The clips can be S-clips or R-clips.

As will be explained in more detail below, clip reel 200 of the first type differs from clip reel 300 of the second type in, among other things, the width d, measured in the axial direction of clip reels 200; 300, while having at least approximately the same diameter of the reel walls and the reel hub. As can particularly be seen in FIG. 6, the width d of clip reel 200 of the first type is smaller than the width D of clip reel 300 of the second type, so that more clips can be wound on clip reel 300 of the second type than on clip reel 200 of the first type while, as already mentioned, the diameter of the reel side walls and the reel hub are at least approximately the same for both reels 200; 300.

As shown in FIG. 1, clipping machine CM is an automatic sealing/clipping machine that includes a sealing unit SU and a clipping unit CU. In sealing unit SU, a continuous tubular casing is formed in a known manner from a film material wound on a supply roll provided in sealing unit SU (not shown), by drawing the film material off the supply roll, passing it over a forming shoulder FS and thus forming it into a tubular casing (also not shown). By means of a heat-sealing device HS of sealing unit SU, the two adjacent or overlapping longitudinal side edges of the film material formed in a tube are welded together.

Filling material is filled into the tubular casing thus formed, wherein the filling material is fed in a feeding direction FD to the tubular casing via a filling tube FT extending substantially horizontally and below as well as beyond heat-sealing device HS. Via filling tube FT, clipping machine CM is connected to a filling machine arranged upstream of clipping machine CM, but not shown in FIG. 1.

Further referring to FIG. 1, clipping unit CU of clipping machine CM is arranged downstream of sealing unit SU. By means of clipping unit CU, the downstream end of a tubular casing formed in sealing unit SU and stored temporarily on filling tube FT downstream of sealing unit SU (not shown), is closed with a closure means like a clip, so that the filling material entering the tubular casing from filling tube FT along feeding direction FD pulls-off the tubular casing from filling tube FT and a sausage-shaped product is formed. The filling material can be sausage meat, glue or any other type of flowable material suitable for being filled in tubular casings.

As soon as a desired length and/or filling volume has reached in the tubular casing just filled, the filling process is briefly interrupted, a filling material-free plait-like portion is formed in the filled tubular casing and closed by means of at least one closure clip. The sausage-shaped product thus formed is then separated from the remaining casing material stored temporarily on filling tube FT, and the separated sausage-shaped product is discharged via a transportation means TM, like a conveyor belt, from clipping machine CM.

As further shown in FIG. 1, clipping machine CM, designed in known manner, comprises, among other things, reel holding means RH disposed on the top of clipping unit CU. As can also be seen from FIG. 1, reel holding means RH are arranged outside the housing surrounding clipping unit CU, so that it can be reached by an operator without having to open clipping machine CM or the housing surrounding clipping unit CU and/or sealing unit SU.

Figure 2A:
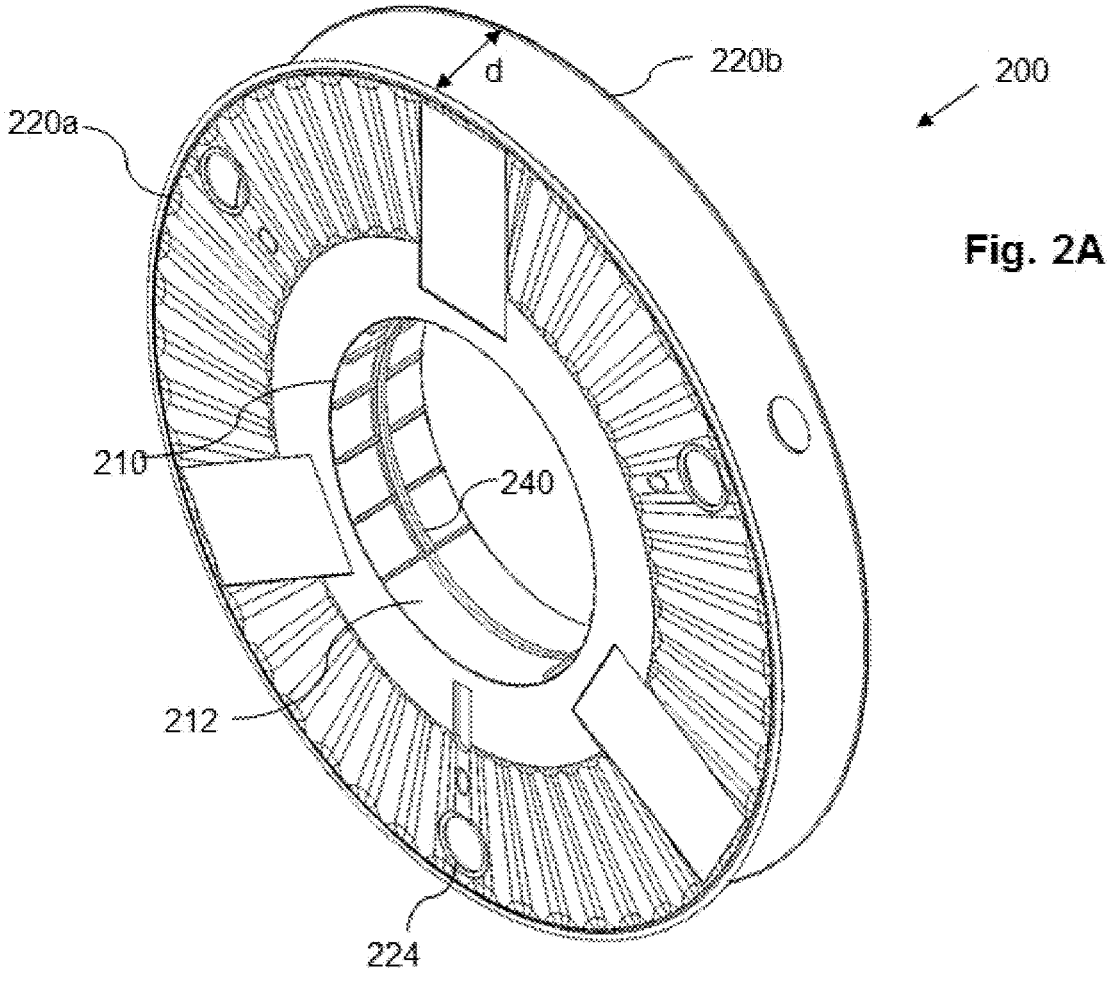
FIG. 2A is an isometric view of a clip reel of a first type.
Figures 2B, 2C:
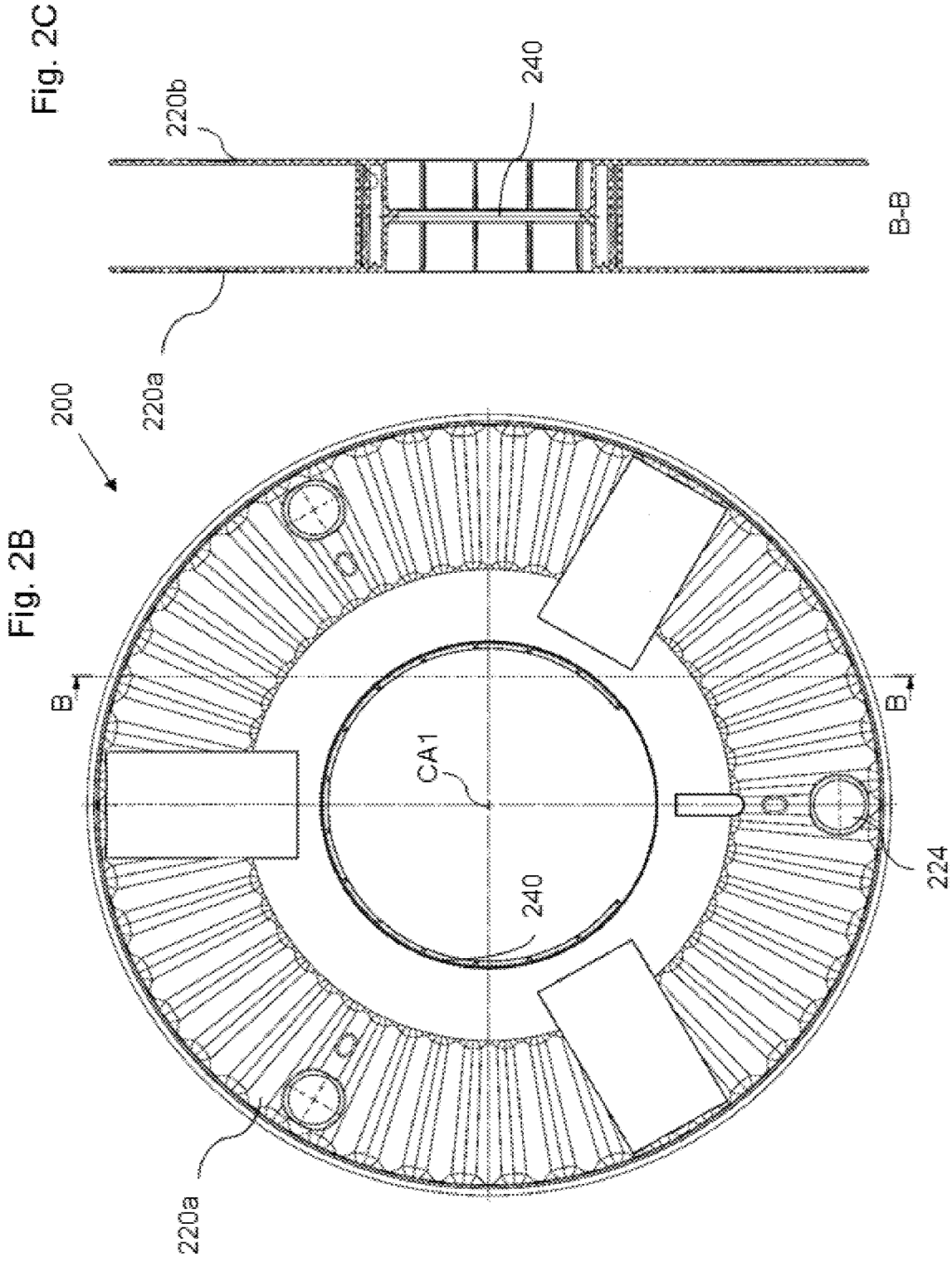
FIG. 2B is a side view of the clip reel according to FIG. 2A.
FIG. 2C is a cross-sectional view of the clip reel according to FIG. 2A along line B-B in FIG. 2B.

FIGS. 2A to 2C show clip reel 200 of the first type, whereas FIGS. 3A to 3F show different embodiments of clip reels 300 of the second type. Each clip reel 200; 300 comprises a tubular hub 210; 310 having a respective longitudinal center axis CA1; CA2. Each hub 210; 310 is at least approximately cylindrically shaped and hollow inside so as to be detachably mounted and rotatably held on reel supporting means of reel holding means RH explained in further detail below. The dimensions of the outer and inner diameter of hub 210 are at least approximately the same as the dimensions of the outer and inner diameter of hub 310.

Each clip reel 200; 300 has two disk-shaped outer walls 220a, 220b; 320a, 320b extending at least approximately perpendicular to longitudinal center axes CA1; CA2 at both front ends of hubs 210; 310. The dimensions of the outer and inner diameter of disk-shaped outer walls 220a, 220b; 320a, 320b is at least approximately the same.

The space between disk-shaped outer walls 220a, 220b; 320a, 320b and the outer circumferential surface of hubs 210; 310 of both reel types is used as storage for closure clips (not shown).

Additionally, disk-shaped outer walls 220a, 220b; 320a, 320b may comprise at least one hole 224; 324, preferably multiple holes, in each outer wall 220a, 220b; 320a, 320b. Having at least one hole 224; 324 in each of disk-shaped outer walls 220a, 220b; 320a, 320b gives the advantage of allowing to check the amount of clips on clip reel 200; 300 from all sides. It is therefore possible to easily confirm the amount of clips left on clip reel 200; 300. Furthermore, it reduces the weight of clip reel 200; 300.

Figure 3A:
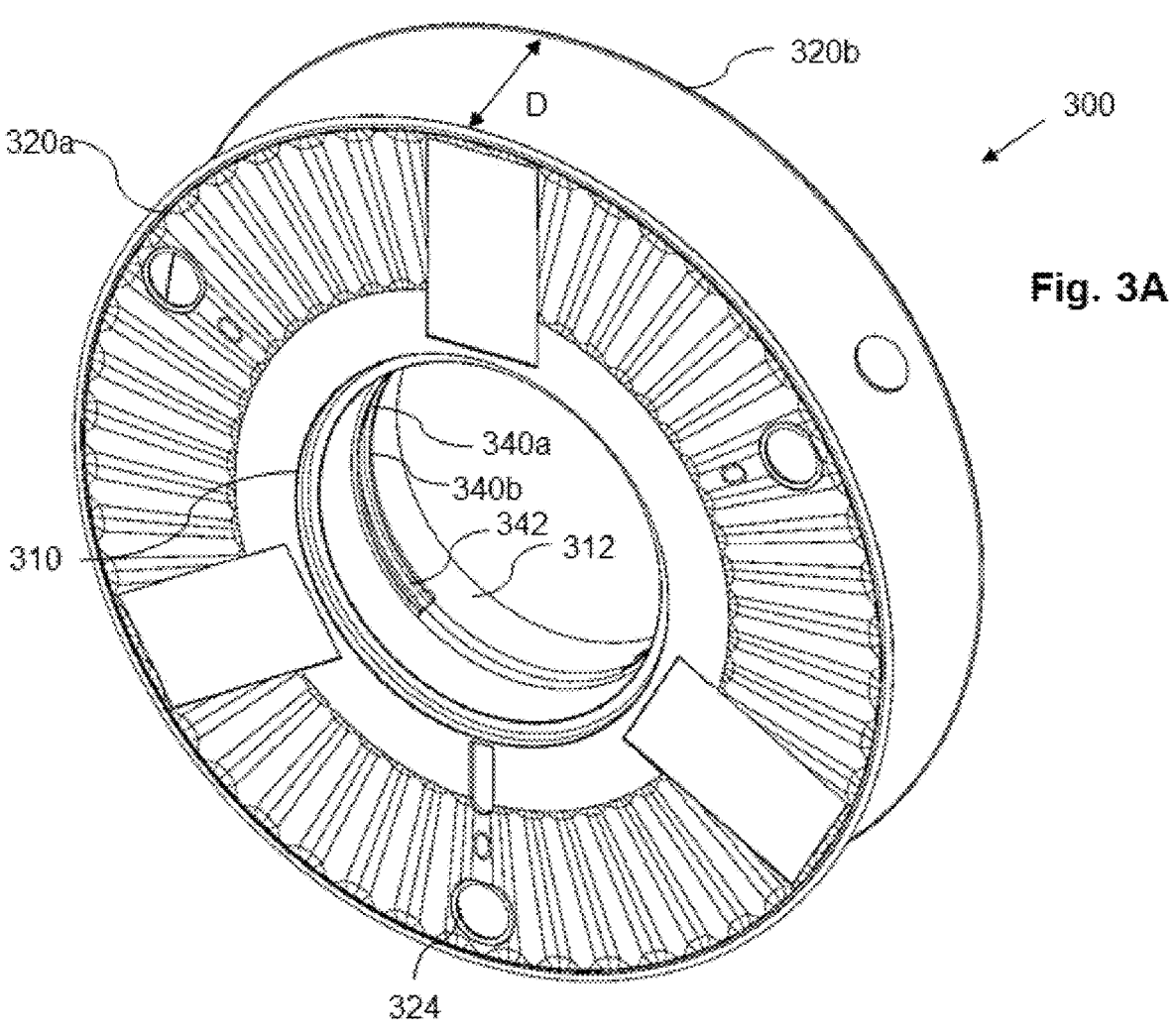
FIG. 3A is an isometric view of a clip reel of a second type.
Figure 3B:
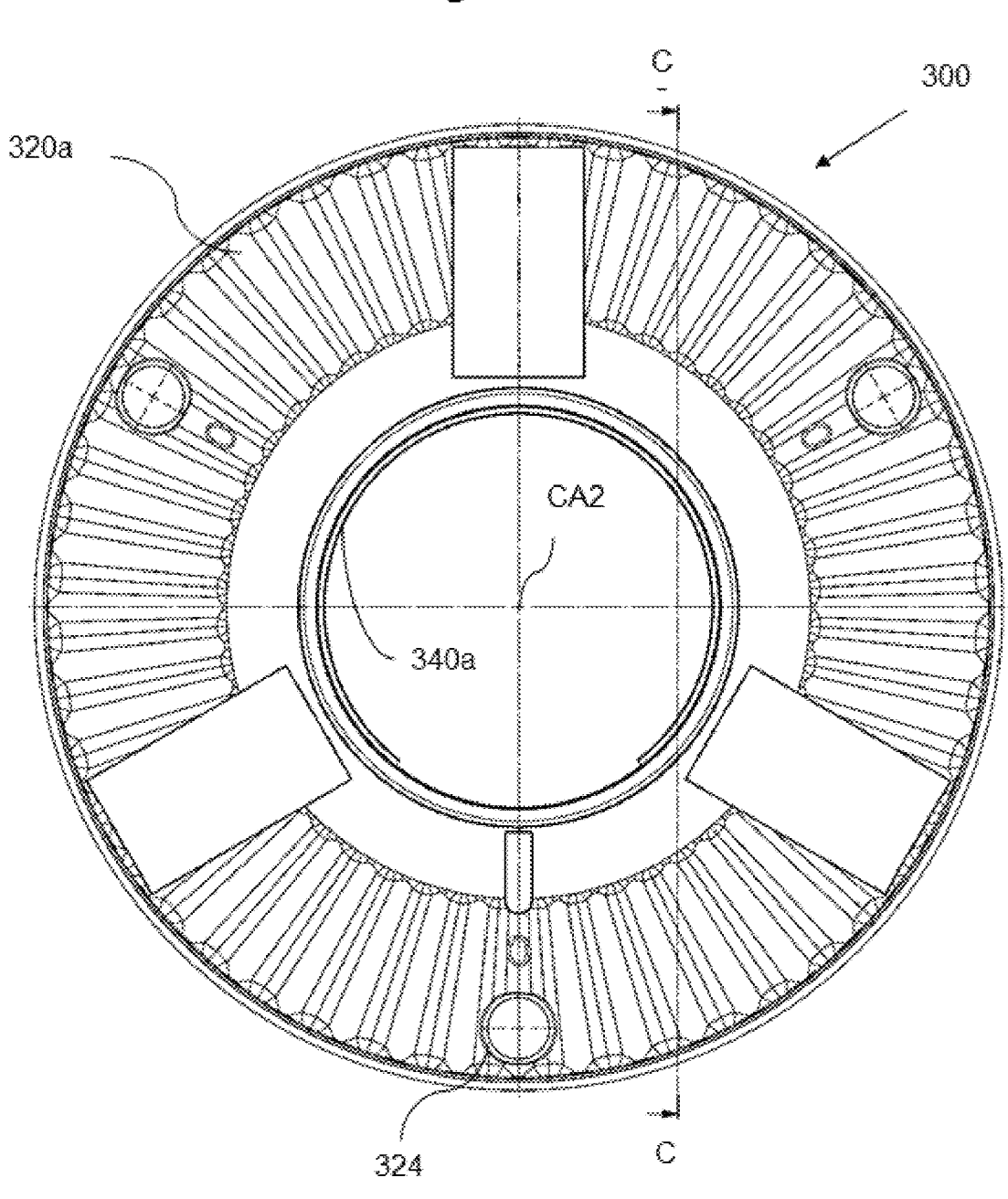
FIG. 3B is a side view of the clip reel according to FIG. 3A.
Figures 3C, 3D:
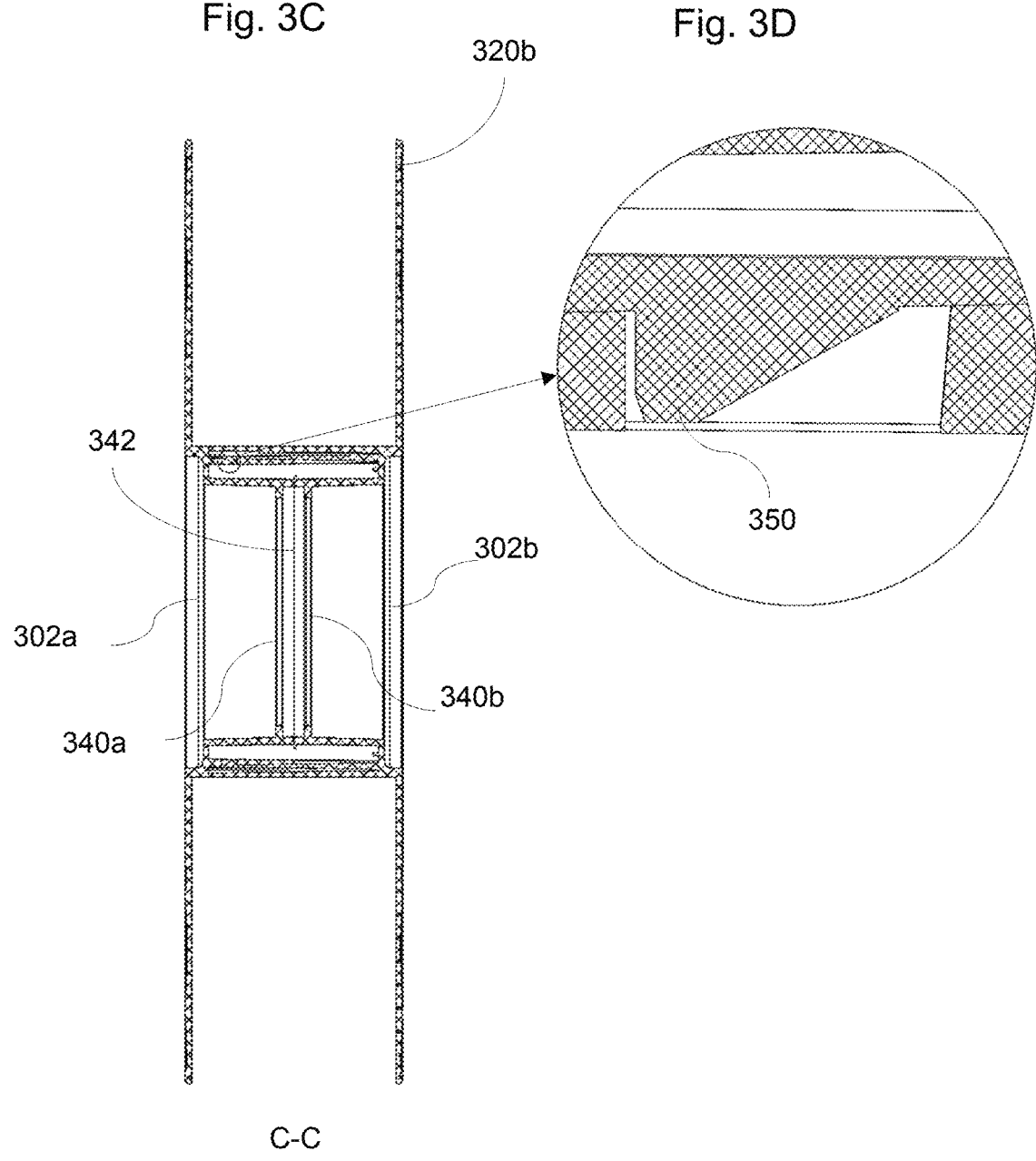
FIG. 3C is a cross-sectional view of the clip reel according to FIG. 3A along line C-C in FIG. 3B.
FIG. 3D is an enlarged view of latch hooks shown in FIG. 3C.
Figure 3E:
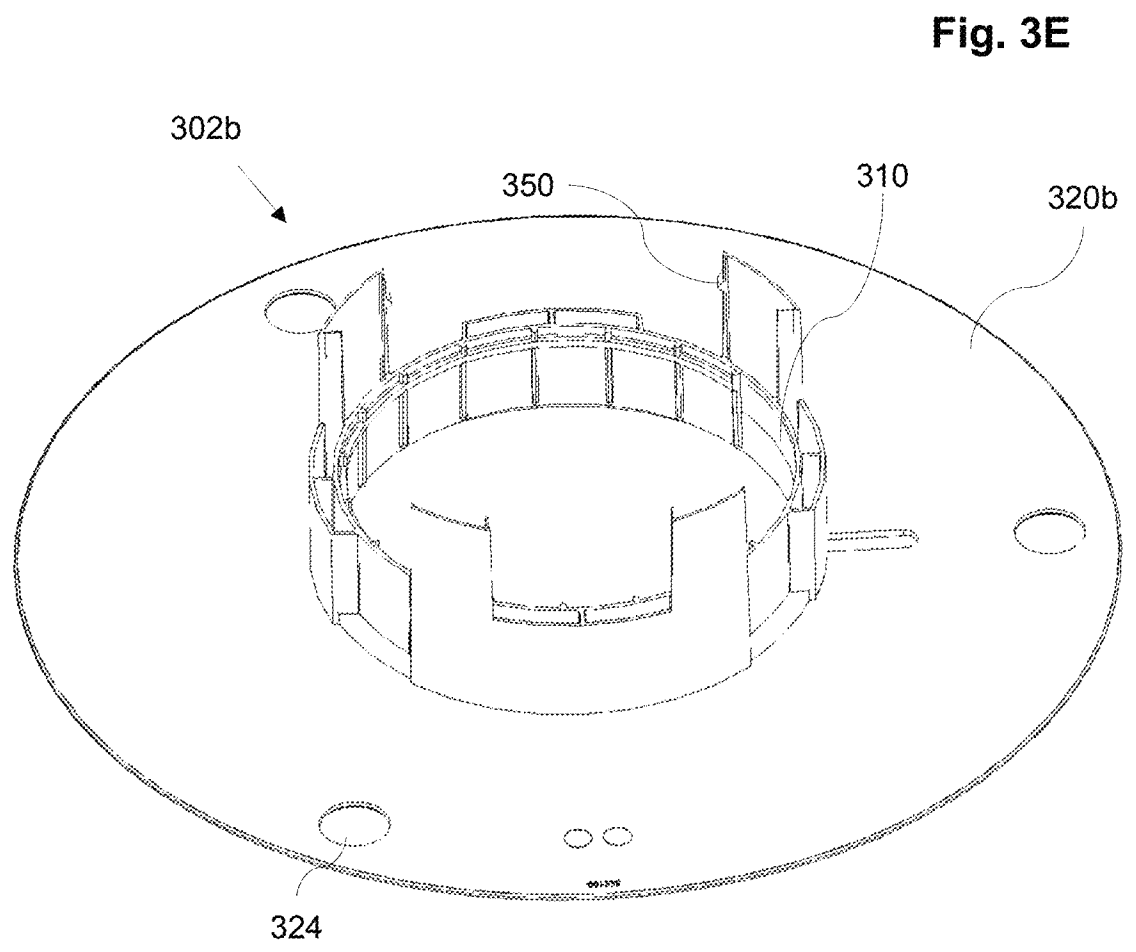
Figure 3F:
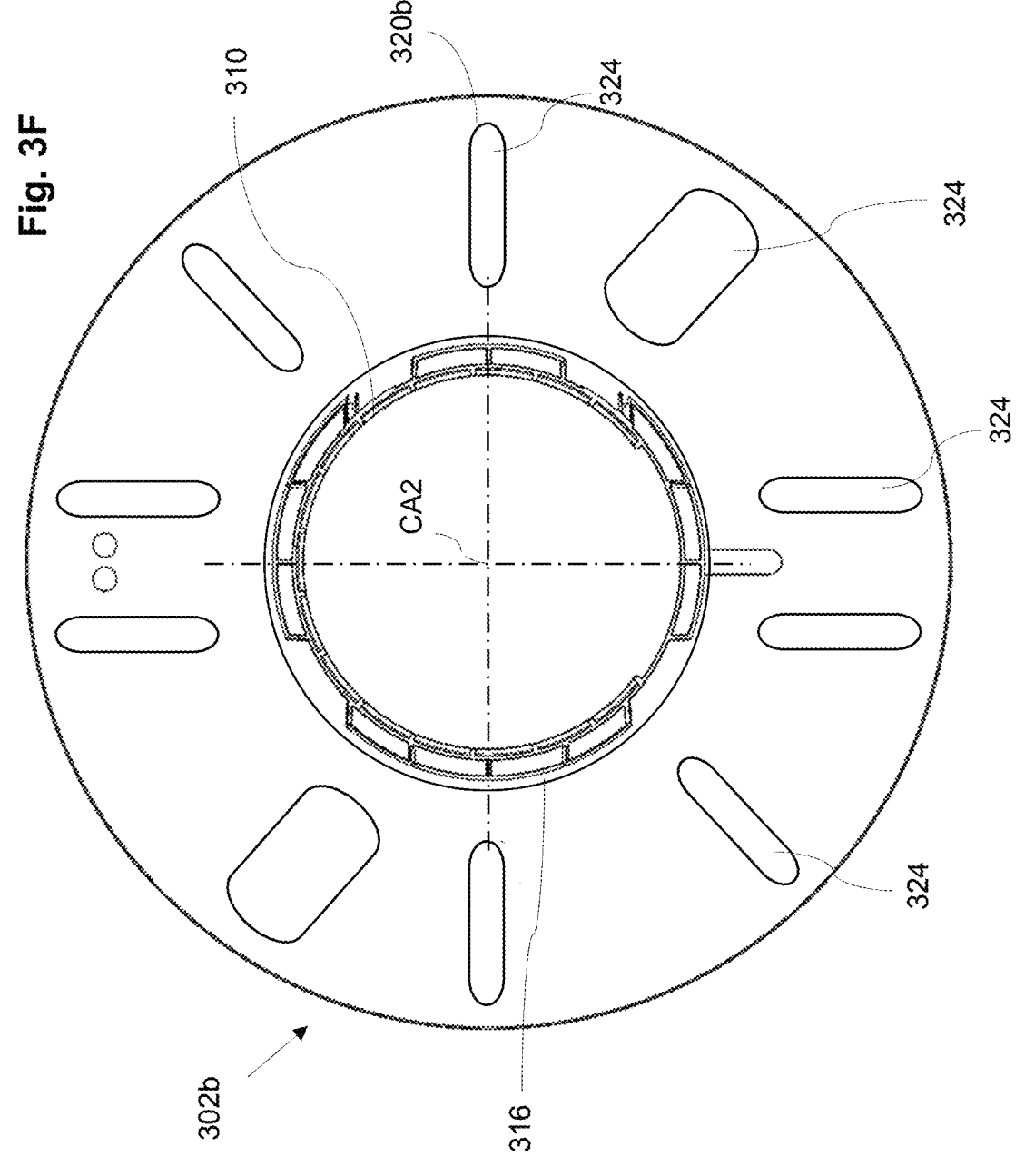
FIG. 3F is a side view of a reel half according to a further embodiment of a clip reel of a second type.

Clip reel 300 of the second type can consist of two similar halves 302a, 302b, whereas different embodiments of a single half 302b are depicted in FIGS. 3E and 3F. Halves 302a, 302b are then combined to a clip reel 300. Halves 302*a*, 302*b* can, for example, be moulded or 3D printed. A mechanism for combining both clip reel halves 302*a*, 302*b* is shown in more detail in FIG. 3D.

As mentioned earlier, one major difference between clip reels 200 of the first type and clip reels 300 of the second type is that a distance d; D between disk-shaped outer walls 220*a*, 220*b*; 320*a*, 320*b*, i.e. the width of clip reel 200; 300 measured parallel to the respective longitudinal center axes CA1; CA2 of clip reel 200; 300 is different. As can be seen from a comparison of FIGS. 2C and 3C or FIGS. 5A and 5B, distance D of clip reel 300 of the second type is greater than distance d of clip reel 200 of the first type.

A further difference between a clip reel 200 of the first type and a clip reel 300 of the second type is that, clip reels 200 of the first type comprise first coupling means 240, whereas clip reels 300 of the second type comprise second coupling means 340*a*, 340*b*. These first and second coupling means 240; 340*a*, 340*b* are arranged on respective inner surfaces 212; 312 of hubs 210; 310.

First coupling means 240 of a clip reel 200 of the first type comprise a rib, which is preferably at least approximately arranged in the center of hub 210 measured along longitudinal center axis CA1. Second coupling means 340*a*, 340*b* of clip reels 300 of the second type comprise two ribs, which are preferably at least approximately arranged preferably in the vicinity of the center of hub 310 measured along longitudinal center axis CA2. Ribs 340*a*, 340*b* may be arranged equidistant to the center of hub 310.

Thus, these first or second coupling means 240; 340*a*, 340*b* differ according to the type of clip reel 200; 300—first or second type—in terms of type, number and positioning on inner circumferential or peripheral surfaces 212; 312 of hubs 210; 310 of clip reels 200; 300.

First or second coupling means 240; 340*a*, 340*b* cooperate with releasable counter-coupling means of reel holding means RH for releasably holding clip reels 200; 300 on axles of reel holding means RH, as will be further explained below.

Rib 240 of clip reel 200 of the first type disposed on inner circumferential surface 212 of hub 210 at least substantially completely surrounds inner circumferential surface 212 of hub 210 at least approximately perpendicular to longitudinal center axis CA1. Rib 240 is arranged at least approximately in the center with respect to the width direction of hub 210 extending parallel to the longitudinal center axis CA1.

As can be seen from FIG. 2C, rib 240 has a rectangular cross-sectional shape, but may have any other cross-sectional shape having a contour protruding from inner peripheral surface 212 of hub 210. Rib 240 may have a width in the range of 1 to 15 mm, preferably in the range of 2 to 6 mm, and a height in the range of 0.3 to 3 mm, preferably in the range of 2 to 2.9 mm.

Referring now to FIGS. 3A to 3F, clip reel 300 of the second type comprises second coupling means formed by two ribs 340*a*, 340*b*, which are spaced apart from each other in the width direction of hub 310, measured parallel to center longitudinal axis CA2, thereby defining a groove 342 at least approximately at the center of hub 310.

Ribs 340*a*, 340*b* extend substantially completely along the inner circumferential surface 312 of clip reel 300 of the second type and at least approximately perpendicular to center longitudinal axis CA2. Ribs 340*a*, 340*b* are arranged symmetrical with respect to the center of hub 310, relative to the width direction of hub 310 running parallel to center longitudinal axis CA2, in such a way that each rib 340*a*, 340*b* has an equal distance to the center of hub 310 as well as to the outer axial front ends of hub 310.

The distance between each rib 340*a*, 340*b* to the center of hub 310 is, inter alia, depending on the width of hub 310 and a locking distance, which is the distance between abutment means and counter-coupling means of reel holding means RH explained in further detail below.

Ribs 340*a*, 340*b* can be designed similar to rib 240 or can have a different design. In particular, they can have a height in the range of 0.3 to 3 mm, preferably in the range of 2 to 2.9 mm and a width in the range of 1 to 15 mm, preferably in the range of 2 to 6 mm.

Groove 342 can have a width in the range of 16 to 30 mm, preferably in the range of 21 to 23 mm.

As can be seen from FIG. 3C, both ribs 340*a*, 340*b* also have a rectangular cross-section with the same cross-sectional area size relative to each other. However, the cross-sectional area of both ribs 340*a*, 340*b* may be smaller than the cross-sectional area size of rib 240 of clip reel 200 of the first type.

FIG. 3B is a side view of clip reel 300 of the second type according to the invention. As depicted, only one disk-shaped outer wall 320*b* is visible, while the other disk-shaped outer wall 320*b* is hidden behind. Similarly, only one rib 340*a* is visible. FIG. 3B shows that ribs 340*a*, 340*b* do not need to extend completely in the circumferential direction. However, while they can be interrupted by a gap, it is also possible that they comprise no gap or a plurality of gaps.

Furthermore, holes 324 in disk-shaped outer walls 320*a*, 320*b* are also depicted arranged at equal angle offsets, while other offsets are also possible.

FIG. 3C is a cross-sectional view of clip reel 300 of the second type depicted in FIG. 3B along line C-C. In this cross-sectional view, disk-shaped outer wall 320*b* is depicted on the right side.

Clip reel 300 of the second type is combined of two clip reel halves 302*a*, 302*b*, where one half 302*b* is shown in FIGS. 3E and 3F. Furthermore, as shown in FIG. 3C, ribs 340*a*, 340*b* as well as groove 342 are depicted in the centre. Ribs 340*a*, 340*b* are located centered with the same offset to the center of groove 342. They are extending at least approximately perpendicular to longitudinal center axis CA2 of inner hub 310.

An enlarged view of a detail indicated by a circle depicted in FIG. 3C is shown in FIG. 3D.

Clip reel 300 of the second type can comprise at least one latch hook 350 to connect both halves 302*a*, 302*b* of clip reel 300 of the second type. Latch hooks 350 are generally disposed circumferentially adjacent hub 310 of clip reel 300 of the second type. To combine both halves 302*a*, 302*b*, they are pressed together until latch hooks 350 latch in on all locations. To latch, other half 302*a*, 302*b* comprises a latch groove or hole, where latch hooks 350 can extend into.

Furthermore, clip reel 300 can be made from a single piece or multiple pieces.

FIG. 3E depicts a first half 302*a* of a clip reel 300 of the second type. First half 302*a* of clip reel 300 of the second type can be combined with a corresponding second half 302*b* (not shown) to a clip reel 300 of the second type.

FIG. 3F is a front view of a clip reel half 302*b* with hub 310, longitudinal center axis CA2 and disk-shaped outer wall 320*b* of a further embodiment of a clip reel 300 of the second type. Clip reel half 302*b* further comprises a space 316 for an item being arranged radially outside of hub 310.

Space 316 between the outer surface of hub 310 and the second circumferential wall may be filled with the dielectric. The dielectric can cover or surround the item. The item can be for example transponders, RFID-tags, data storage or other items. The dielectric protects the item in space 316 against disruptive effects on signal transmission that may be caused by reel holding means RH or closure means arranged on second circumferential wall.

The width of space 316 can be in the range of 3 to 30 mm, preferably in the range of 8 to 14 mm.

Space 316 can be arranged with a radial offset from inner hub 310 or with no offset to inner hub 310. The radial offset be in the range of 1 to 10 mm, preferably in the range of 2 to 4 mm.

Space 316 can be arranged sandwiched on hub 310 between an outer surface of hub 310 and a second circumferential wall further radially outside of outer surface of hub 310 in a double wall manner.

Furthermore, as space 316 is enclosed by two walls, space 316 is protected from physical damage and/or manipulation.

As being depicted in FIGS. 3A to 3F, while holes 324 can be of different sizes and shapes, they can also be of the same size and shape. Further, holes 324 can be evenly or unevenly arranged.

Figure 4:
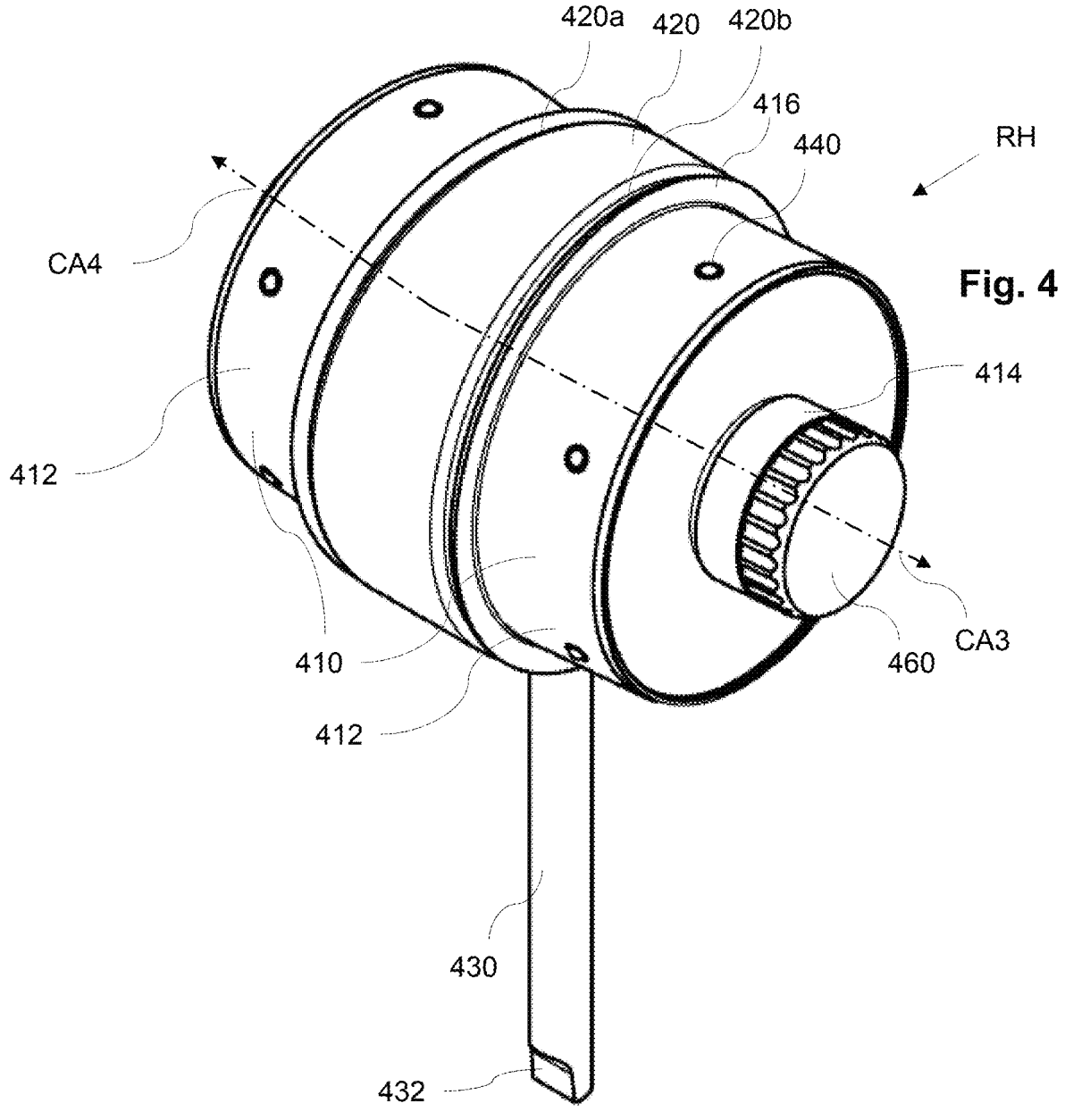
FIG. 4 is an isometric view of the reel holding means shown in FIG. 1.

FIG. 4 depicts reel holding means RH for holding clip reels 200; 300 of the first and/or second type. Reel holding means RH comprises at least one shaft 410 having a center axis CA3, a middle portion 420 and a post or bracket 430. In FIG. 4, two shafts 410 with a two center axes CA3, CA4 are shown.

Each shaft 410 is rotatable about an axle 414 with center axes CA3, CA4, such that clip reel 200; 300 (not shown) can rotate with shaft 410 about axle 414 and center axis CA3, CA4. However, clip reel 200; 300 can also rotate relative to shaft 410.

Shaft 410 comprises abutment means 416 for restraining clip reels' 200; 300 axial movement in the direction towards to tilted side surfaces 420a, 420b and/or for stabilization of clip reel 200; 300.

Furthermore, each shaft 410 comprises an end cap 460 (only one end cap 460 is shown in FIG. 4). End cap 460 can comprise a grooved surface for better gripping. In general, end cap 460 is used to tighten shaft 410 onto middle portion 420 via a torque mechanism by rotating end cap 460 in opposite or equal direction. End cap 460 can be used to set the rotation resistance of each respective shaft 410. End cap 460 can be tightened by rotation, therefore increasing or decreasing the rotation resistance of respective shaft 410.

Middle portion 420 can comprise two tilted side surfaces 420a, 420b which extend at least approximately perpendicular to respective center axes CA3, CA4 (cf. FIGS. 4 to 6) such that center axes CA3, CA4 of attached shafts 410 are tilted to each other in an obtuse angle which can be in the range of 163° to 180°, preferably in the range of 165° to 172° more preferably in the range of 169° to 171°.

Middle portion 420 can be made of any suitable material, such as metal, plastics or carbon.

Center axes CA3 and CA4 can also be parallel, such that side surfaces 420a, 420b are not tilted but parallel with respect to each other.

Figure 5A:
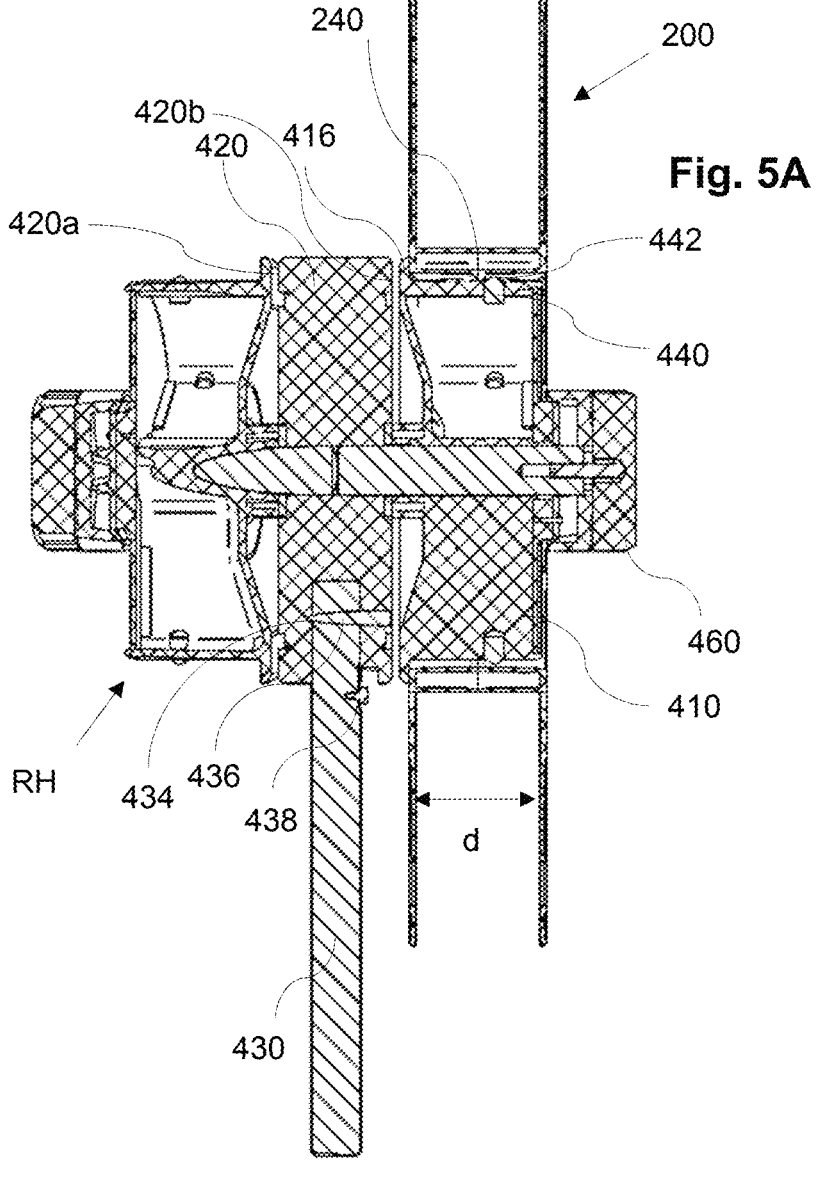
FIG. 5A is a cross-sectional view of the reel holding means shown in FIG. 4 and the clip reel of the first type shown in FIGS. 2A to 2C.
Figure 5B:
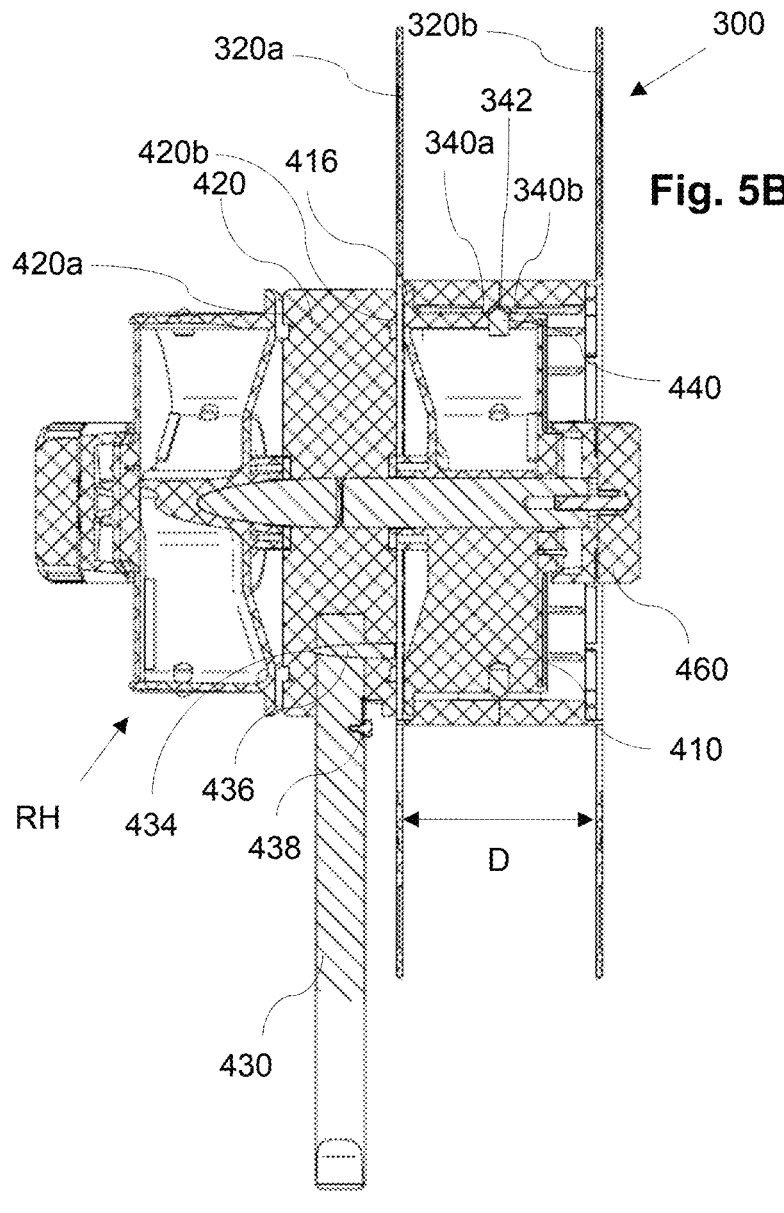
FIG. 5B is a cross-sectional view of the reel holding means shown in FIG. 4 and a clip reel of the second type shown in FIGS. 3A to 3F.

Post 430 is used to attach reel holding means RH to clipping machine CM. For this manner, post 430 is fixed to middle portion 420 via a bolt 436 or other attachment means, as depicted in FIGS. 5A and 5B. Post 430 comprises a bore 434 for interlocking with middle portion 420 and is inserted into the radial surface of middle portion 420 and fixated with for example a pin 438. Pin 438 is inserted into another bore on the axial surface of middle portion 420 and extends into the corresponding bore of post 430. Furthermore, post 430 can comprise a notch 432 located on the side that is facing away from middle portion 420.

To securely mount clip reel 200; 300 onto reel holding means RH, reel holding means RH further comprises several counter-coupling means 440, such as at least one, preferably several radially extending holder noses 440, located at the outer surface 412 of shaft 410.

Referring to FIGS. 4 and 5A, holder nose 440 is arranged substantially perpendicular to center axis CA3 of shaft 410 at outer surface 412 of shaft 410. Holder nose 440 projects radially outwardly from the outer radial surface of shaft 410. As depicted in FIG. 5A, holder nose 440 comprises a cylindrically-shaped body with at least one rounded tip 442, preferably in a cone-like or frustoconical shape. However, other shapes are also possible. The length of holder nose 440 may be in the range of 1 to 5 mm, preferably in the range of 2.5 to 3.5 mm.

Holder nose 440 is oriented such that the rounded tip extends radially away from the outer surface 412 of shaft 410. For interaction with clip reel 200; 300 holder nose 440 releasably locks clip reel 200; 300 in place by abutting against first or second coupling means 240; 340a, 340b of a clip reel 200 of the first type or a clip reel 300 of the second type and the abutment means.

The elasticity of clip reel 200; 300 and/or sliding movement of clip reel 200; 300 over the rounded tip of holder nose 440 can push clip reel 200; 300 in place.

Holder nose 440 can also comprise biasing means, such as springs or spring bearings, in order to retract holder nose 440 into shaft 410 when clip reel 200; 300 is moved parallel to the outer surface 412 of shaft 410 and center axis CA3. Holder nose 440 is then pushed radially inwards by first or second coupling means 240; 340a, 340b of clip reel 200; 300. Reversibly, when removing clip reel 200; 300, holder nose 440 can retract due to biasing means or the elasticity of clip reel 200; 300 and the clip reel 200; 300 can be removed.

Ribs 340a, 340b of the clip reel 300 of second type or rib 240 of the clip reel 200 of the first type are used for interlocking with counter-coupling means 440 of reel holding means RH.

By interlocking counter-coupling means 440 with ribs 340a, 340b or rib 240 or groove 342, clip reel 200; 300 of the first or second type is restricted from moving in axial direction and can only rotate in circumferential direction. Clip reel 200; 300 of the first or second type is able to rotate both clockwise and counter-clockwise.

Additionally, as ribs 340a, 340b are located with the same distance to the centre of hub 310, clip reel 300 of the second type can be approximately symmetric and can therefore be mounted on reel holding means RH in both orientations, that means with clip reel 300 of the second type rotated 180° around the radial axis.

Clip reel 200 of the first type preferably has a rib located in the centre and can therefore be also approximately symmetric. However, if clip reel 200 of the first type comprises a groove instead of a rib, the groove can be also be displaced from the center of the hub.

Figure 6:
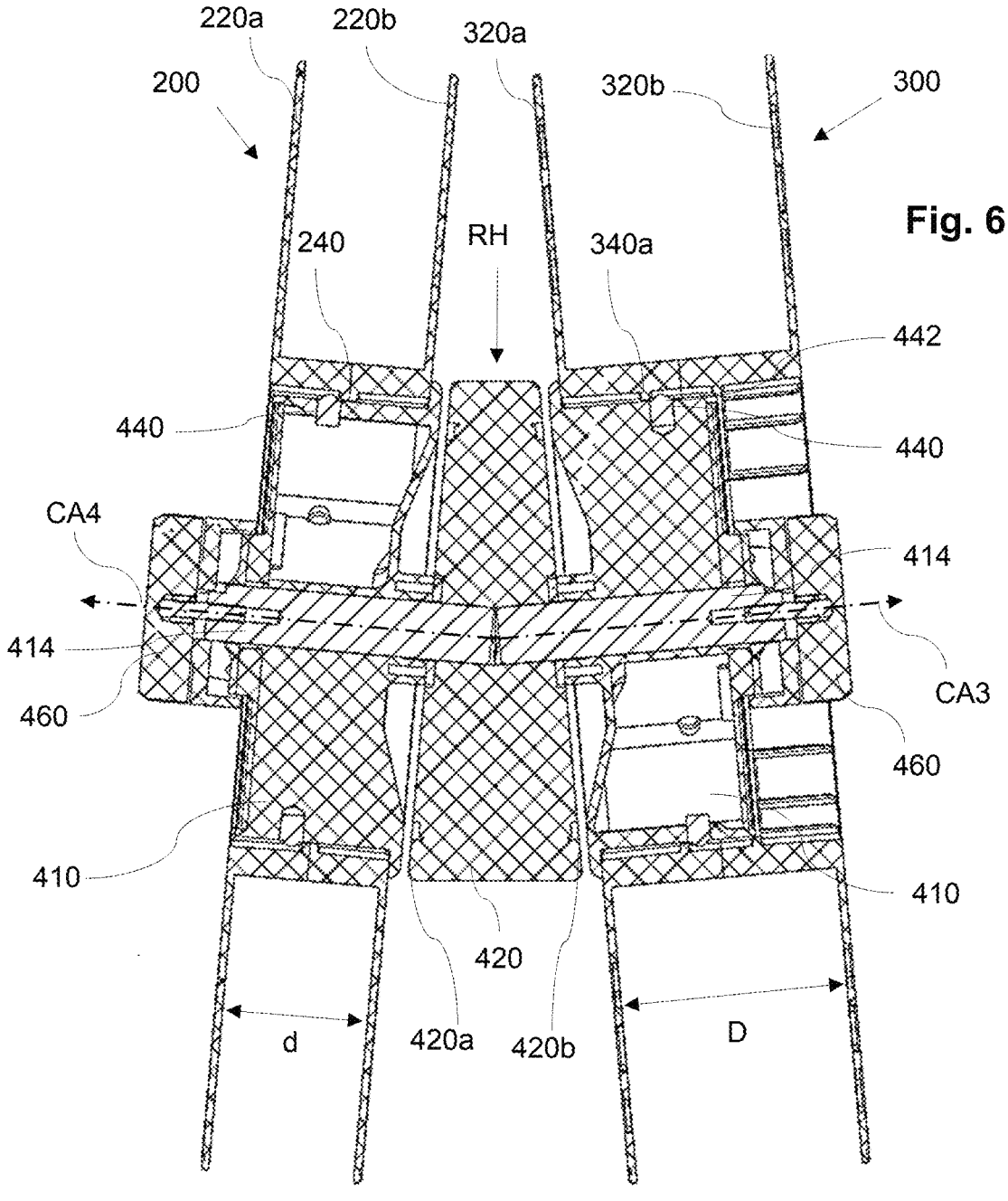
FIG. 6 a cross-sectional top view of the reel holding means with a clip reel of the first type and a clip reel of the second type.

Further referring to FIGS. 4 to 6, reel holding means RH are capable of holding different types of clip reels 200; 300. Apart from a matching diameter of hubs 210; 310 of clip reels 200; 300, the aspect of reel holding means RH being capable of mounting different types of clip reels 200; 300 and stabilize them in the axial direction is the locking distance.

The distance between abutment means 416 and counter-coupling means 440 is defined as so-called locking distance. For a clip reel 200; 300 to be compatible with reel holding means RH, clip reel 200; 300 must have first or second coupling means 240; 340a, 340b approximately at a distance from the outer edge of hub 210; 310 that is equal to the locking distance. The locking distance can be in the range of 20 to 50 mm, preferably in the range of 28 to 33 mm, even more preferably in the range of 30 to 31 mm.

Clip reel 200 of the first type has first coupling means 240 generally be located in the center of hub 210. Thus, the overall width of clip reel 200 of the first type is defined by two times the locking distance and the width of first coupling means 240.

Clip reel 300 of the second type has second coupling means 340a, 340b generally be located adjacent the center of hub 310. That is such that the distance between an outer edge of hub 310 and an edge of second coupling means 340a, 340b is equal to the locking distance. For example, the width of clip reel 300 of second type is then defined by two times the locking distance plus an additional width.

Clip reel 300 of the second type may be held in place by having holder noses 440 slide into groove 342 defined by ribs 340a, 340b. Holder noses 440 then abut against one of each rib 340a, 340b or both ribs 340a, 340b.

Alternatively, second coupling means 340a, 340b can also consist of groove 342 without comprising two ribs 340a, 340b. Holder noses 440 extend then into groove 342 and abut against both axial oriented edges defined by groove 342. Clip reel 300 of the second type is then axially locked.

Ribs 340a, 340b are disposed on two planes at least approximately perpendicular to longitudinal axis CA2 in hub 310 of clip reel 300 of the second type adjacent the center of hub 310. This allows to mount clip reel 300 of the second type in two orientations.

FIGS. 5A and 5B depict cross-sectional views of a reel holding means RH with a middle portion 420 with a respective clip reel 200; 300 of the first or the second type being releasably attached onto reel holding means RH. FIG. 5A shows a clip reel 200 of a first type comprising a rim wherein FIG. 5B depicts the same reel holding means RH as shown in FIG. 5A, with the difference that clip reel 300 of the second type is mounted instead of clip reel 200 of the first type.

As can be inferred from FIG. 5B, width D of clip reel 300 of the second type is larger than width d of clip reel 200 of the first type, thus offering more space between the outer disk-shaped walls 320a, 320b for loading a larger amount of closure means.

Another difference of clip reel 300 of the second type with respect to clip reel 200 of the first type is that the disk-shaped outer wall 320a, which is positioned closer to middle portion 420, is positioned over abutment means 416 of reel holding means RH. Therefore, the available space defined by rim width D is further increased.

FIG. 6 depicts a cross-sectional view of reel holding means RH from above as described earlier having middle portion 420, two shafts 410 with counter-coupling means 440 and end caps 460. Furthermore, shafts 410 are holding clip reels 200; 300 of both first and second type. Clip reel 200 of the first type is held on shaft 410 on the left side, while larger clip reel 300 of the second type is held on shaft 410 on the right side.

Axles 414 being oriented parallel with center axes CA3, CA4 are arranged with an obtuse angle to each other and being perpendicular to respective tilted side surfaces 420a, 420b of middle portion 420. Thus, clip reels 200; 300 are also oriented with an obtuse angle to each other.

As can be further derived from FIG. 6, clip reel 300 of the second type is protruding beyond the outer axial end of shaft 410. Further should be noted that in FIG. 6, clip reel 300 of the second type can also comprise only one rib 340a being decentral as second coupling means instead of two ribs 340a, 340b.

Figure 7:
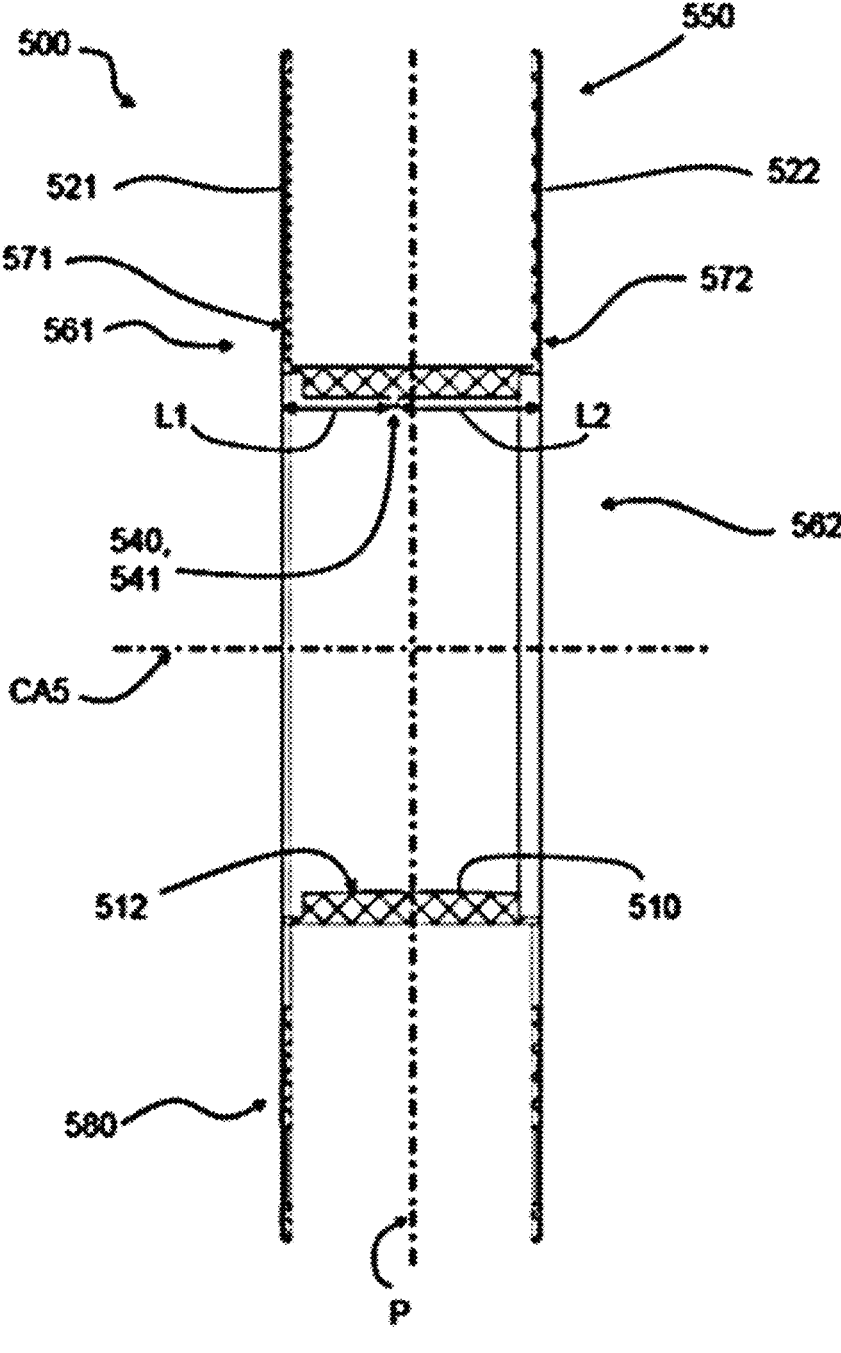
FIG. 7 a cross-sectional view of a clip reel of a third type similar to the cross-sectional view of FIG. 3C.

FIG. 7 shows a cross-sectional view of a clip reel 500 of a third type. A side view and isometric view of clip reel 500 of the third type could be substantially identical to the views of clip reel 300 of the second type provided in FIGS. 3A and 3B respectively with the exception of the location of third coupling means 540 on clip reel 500 of the third type. Clip reel 500 of the third type comprises a hub 510 with a longitudinal center axis CA5. Similar to clip reel 300 of the second type, third coupling means 540 of clip reel 500 of the third type are provided on an inner surface 512 of hub 510. A clipping machine CM of a system 100 for manufacturing sausage-shaped products comprising clip reel 500 of the third type could be formed similar or identical to clipping machine CM shown in FIG. 1. Such a system 100 can further comprise a clip reel 200 of the first type and/or of a clip reel 300 of the second type.

In the embodiment shown in FIG. 7, clip reel 500 of the third type comprises exactly one third counter coupling means 540. Third coupling means 540 is here formed by a rib 541 extending from an inner surface 512 of a hub 540 toward center axis CA5 of clip reel 500 of the third type. However, third counter coupling means 540 could also be formed by a groove or in any other suitable manner.

A main body 550 of clip reel 500 of the third type is symmetrical to a center plane or symmetry plane P perpendicular to center axis CA5. Tthird counter coupling means 540 are provided on inner surface 512 at a location spaced apart from symmetry plane P along center axis CA5. Therefore, clip reel 500 of the third type is symmetrical to center plane P except for third counter coupling means 540.

Third counter coupling means 540 divides clip reel 500 of the first type into a first axial section 561 and a second axial section 562. First and second axial sections 561, 562 extend along center axis CA5 of clip reel 500 of the third type. First axial section 561 has a first axial length L1 along center axis CA5 and second axial section 562 has a corresponding second axial length L2 along center axis CA5.

First axial length L1 of first axial section 561 is measured between a first axial end surface 571 of clip reel 500 of the third type and third coupling means 540. In the embodiment of clip reel 500 of the third type shown in FIG. 7, first axial end surface 571 is an outer surface of a first outer wall 521 of clip reel 500. Second axial length L2 of second axial section 562 is measured between a second axial end surface 572 of clip reel 500 of the third type and third coupling means 540. Similar to first axial end surface 571, second axial end surface 572 of clip reel 500 of the third type is formed by an outer wall 522 of clip reel 500.

First axial length L1 of first axial section 561 is shorter than second axial length L2 of second axial section 562. Clip reel 500 of the third type may be mounted on shaft 410 in two possible orientations. However, engagement of third coupling means 540 with counter-coupling means 440 of reel holding means RH is only possible in one axial orientation of clip reel 500 of the third type.

In the embodiment of FIG. 7, third coupling means 540 of clip reel 500 of the third type can engage counter-coupling means 440 of reel holding means RH if first axial section 561 is oriented towards abutment means 416, in particular when first outer wall 521 abuts abutment means 461. First axial length L1 preferably substantially equals a locking distance measured along axle center axis CA3 or CA4 between abutment means 416 and counter-coupling means 440.

Clip reel 500 of the third type may comprise a marker 580. In the embodiment of FIG. 7, marker 580 is formed by or part of first outer wall 521 having, for example, another color than second outer wall 522 of the reel 500 of the third type.

REFERENCE SIGNS

CA1 longitudinal center axis of a clip reel of a first type
CA2 longitudinal center axis of a clip reel of a second type
CA3 center axis of axle
CA4 center axis of axle
CU clipping unit
CM clipping machine
FD feeding direction
FS forming shoulder
FT filling tube
HS heat-sealing device
L1 first axial length
L2 second axial length
P symmetry plane/center plane
RH reel holding means
SU sealing unit
TM transportation means
100 system
200 clip reel of a first type
210 hub
212 inner surface of hub
220*a* disk-shaped outer wall
220*b* disk-shaped outer wall
224 hole
240 rib
300 clip reel of a second type
302*a* first half of clip reel of a second type
302*b* second half of clip reel of a second type
310 hub
312 inner surface of hub
316 space
320*a* disk-shaped outer wall
320*b* disk-shaped outer wall
324 hole
340*a* rib
340*b* rib
342 groove
350 latch hook
410 shaft
412 outer surface of shaft
414 axle
416 abutment means
420 middle portion
420*a* tilted side surface
420*b* tilted side surface
430 post
432 notch
434 bore
436 bolt
438 pin
440 holder nose
442 rounded tip
460 end caps
500 clip reel of the third type
510 hub of the clip reel of the third type
512 inner surface clip reel of the third type
521 first outer wall clip reel of the third type
522 second outer wall clip reel of the third type
540 third coupling means 541 rib forming the third coupling means
550 main body of the clip reel of the third type
561 first axial section clip reel of the third type
562 second axial section clip reel of the third type
571 first axial end surface clip reel of the third type
572 second axial end surface clip reel of the third type
580 marker

The invention claimed is:

1. A system for manufacturing sausage-shaped products, the system comprising a clipping machine and at least a clip reel of a first type and at least a clip reel of a second type, or only at least a clip reel of the second type, each of which is configured to receive a plurality of closure means, wound thereon, wherein the clip reel of the first type has a hub with a longitudinal center axis and an inner surface provided with first coupling means being arranged at least approximately in the center of the clip reel relative to the longitudinal center axis;

wherein the clip reel of the second type has a hub with a longitudinal center axis and an inner surface provided with second coupling means being arranged at least in the vicinity of the center of the clip reel relative to the longitudinal center axis;

wherein the clipping machine has at least one reel holding means configured to hold at least one clip reel of the first or the second type and comprising:

at least one shaft for receiving a clip reel of the first or second type, at least one abutment means against which the clip reel of the first or second type mounted on the shaft abuts in one axial direction of the shaft, and at least one counter-coupling means cooperating with the first or second coupling means of the clip reel of the first or second type for reversibly fixing the clip reel on the shaft in the other axial direction of the shaft.

2. The system of claim 1, wherein a distance between the abutment means and the counter-coupling means of the reel holding means is at least approximately equal to a distance on the clip reel of the first or second type between a front end of the clip reel of the first or second type and the first or second coupling means of the clip reel of the first or second type, such that a clip reel mounted on the shaft of the reel holding means cannot move in the axial direction of the shaft during operation.

3. The system according to claim 1, wherein the coupling means of a clip reel of the first or second type comprises at least one rib at least approximately extending in circumferential direction for interaction with the counter-coupling means of the reel holding means.

4. The system according to claim 1, wherein the counter-coupling means of the shaft comprises biasing means, such that the counter-coupling means retract into the shaft when force is exerted onto the counter-coupling means and return out of the shaft when no force is exerted onto the counter-coupling means.

5. The system according to claim 1, wherein the counter-coupling means comprise multiple holder noses, preferably arranged circumferentially.

6. The system according to claim 1, wherein the reel holding means comprises two shafts, each shaft for receiving a clip reel of the first or second type, wherein preferably the two shafts are arranged at least substantially opposite to each other.

7. The system according to claim 1, wherein the clip reels of the first and second type comprise radially extending outer walls defining a space for the closure means, and wherein one outer wall abuts against the abutment means of the reel holding means.

8. A clip reel for holding closure means to be used for manufacturing sausage-shaped products comprising
   a hub having an inner surface and a longitudinal center axis, and
   wherein the inner surface of the hub comprises coupling means, wherein the coupling means are adapted to lock the clip reel onto a shaft of reel holding means of a clipping machine in conjunction with counter-coupling means of the shaft by having the counter-coupling means of the shaft couple with the coupling means of the clip reel.

9. The clip reel according to claim 8, wherein the clip reel consists of two halves.

10. The clip reel according to claim 8, wherein the coupling means of the clip reel comprises two to an extent circumferentially disposed ribs.

11. The clip reel according to claim 8, wherein the coupling means of the clip reel comprises at least one groove.

12. The clip reel according to claim 8, wherein the interaction of the counter-coupling means with the coupling means of the clip reel comprises projection of the counter-coupling means into a free space defined by the coupling means of the clip reel.

13. The clip reel according to claim 8, wherein the hub comprises outer walls extending radially from the outer surface of the hub to hold closure means between the outer surface of the hub and the outer wall.

14. The clip reel according to claim 9, wherein the clip reel comprises at least one space for an item.

15. The clip reel according to claim 14, wherein the at least one space comprises at least a dielectric which covers the item.

16. A system for manufacturing sausage-shaped products the system comprising a clipping machine and at least a clip reel of a first type and at least a clip reel of a third type, or only at least a clip reel of the third type, each of which is configured to receive a plurality of closure means wound thereon,
   wherein the clip reel of the first type has a hub with a longitudinal center axis and an inner surface provided with first coupling means being arranged in the center of the clip reel relative to the longitudinal center axis;

wherein the clip reel of the third type has a hub with a longitudinal center axis and an inner surface provided with third coupling means, wherein the third coupling means divide the clip reel of the third type into a first axial section and a second axial section, wherein an axial length of the first axial section is shorter than an axial length of the second axial section;
   wherein the clipping machine has at least one reel holding means configured to hold at least one clip reel of the first or the third type and comprising:
      at least one shaft for receiving a clip reel of the first or third type,
      at least one abutment means, against which the clip reel of the first or third type mounted on the shaft abuts in an axial direction of the shaft, and
      at least one counter-coupling means cooperating with the first or third coupling means of the clip reel of the first or third type for reversibly fixing the clip reel on the shaft in the other axial direction of the shaft,
      wherein the clip reel of the first type can be fixed to the reel holding means in two longitudinal orientations and wherein the third coupling means of the clip reel of the third type can only engage the counter-coupling means when the first axial section of the clip reel of the third type is oriented towards the abutment means of the reel holding means.

17. The system according to claim 16, wherein the clip reel of the third type comprises exactly one third coupling means.

18. The system according to claim 16, wherein the clip reel of the third type is symmetrical to a center plane perpendicular to its center axis except for the third counter coupling means.

19. The system according to claim 16, wherein the clip reel of the third type comprises a marker identifying the first axial section or the second axial section.

20. A clip reel for holding closure means to be used for manufacturing sausage-shaped products comprising
   a hub having an inner surface and a longitudinal center axis, and
   wherein the inner surface of the hub comprises coupling means, wherein the coupling means divide the clip reel into a first axial section and a second axial section, wherein an axial length of the first axial section is shorter than an axial length of the second axial section; wherein the coupling means are adapted to lock the clip reel onto a shaft of reel holding means of a clipping machine in conjunction with counter-coupling means of the shaft by having the counter-coupling means of the shaft couple with the coupling means of the clip reel when the first axial section is oriented away from a free end of the shaft.

* * * * *